(12) United States Patent
Singh Mumick et al.

(10) Patent No.: US 12,407,680 B2
(45) Date of Patent: *Sep. 2, 2025

(54) RICH ONE-TIME PASSWORD MESSAGE

(71) Applicant: Gupshup Inc., Fremont, CA (US)

(72) Inventors: Inderpal Singh Mumick, Berkeley Heights, NJ (US); Surinder Singh Anand, Highland, NJ (US)

(73) Assignee: Gupshup Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,175

(22) Filed: May 19, 2024

(65) Prior Publication Data

US 2024/0372854 A1 Nov. 7, 2024

Related U.S. Application Data

(63) Continuation of application No. 17/317,945, filed on May 12, 2021, now Pat. No. 11,991,167.

(60) Provisional application No. 63/024,503, filed on May 13, 2020.

(51) Int. Cl.
 *H04L 29/06* (2006.01)
 *H04L 9/40* (2022.01)
 *H04W 4/14* (2009.01)

(52) U.S. Cl.
 CPC ......... *H04L 63/0838* (2013.01); *H04W 4/14* (2013.01)

(58) Field of Classification Search
 CPC ...... H04L 63/0838; H04W 4/14; H04W 12/06
 See application file for complete search history.

(56) References Cited

U.S. PATENT DOCUMENTS

| | | | |
|---|---|---|---|
| 2008/0098630 A1* | 5/2008 | Frankenbach | G09F 23/00 40/312 |
| 2009/0038127 A1* | 2/2009 | Farmer | G09F 23/00 24/67 R |
| 2010/0300147 A1* | 12/2010 | Farmer | A44C 15/0015 63/3.1 |
| 2018/0176212 A1* | 6/2018 | Nair | H04L 63/0838 |
| 2023/0007449 A1* | 1/2023 | Mumick | G06Q 30/0241 |

* cited by examiner

*Primary Examiner* — Phy Anh T Vu
(74) *Attorney, Agent, or Firm* — Ashok Tankha

(57) ABSTRACT

A method and system for creating and transmitting a rich one-time password (ROTP) message are provided. The ROTP message comprises a one-time password and a brand identity, and optionally a button to confirm a transaction, and a button to report a potential fraud. The method employs a rich one-time password application (ROTPA) to create and transmit the ROTP message to a user device using rich data messaging platforms, such as Rich Communication Services (RCS), WhatsApp, iMessage, Viber, etc. The user conveys the confirmation of the transaction by selecting the "confirm" button, or by responding with "Confirm". The transaction confirmation helps authenticate a user transaction and/or a user login. The user conveys the potentially fraudulent activity to the ROTPA by selecting the "report fraud" button, or by responding with "Report Fraud".

24 Claims, 20 Drawing Sheets

FIG. 12A

RICH ONE-TIME PASSWORD MESSAGE

CROSS-REFERENCE TO RELATED APPLICATION

This application is a continuation of non-provisional patent application Ser. No. 17/317,945, titled "Rich One-Time Password Message", filed in the United States Patent and Trademark Office on May 12, 2021, which claims the benefit of provisional patent application No. 63/024,503, titled "Rich One-Time Password Message", filed in the United States Patent and Trademark Office on May 13, 2020. The specification of the above referenced patent applications are incorporated herein by reference in their entirety.

BACKGROUND

A one-time password (OTP) is a numeric or alphanumeric string of characters that authenticates a user for a single transaction, or for logging on to a system. One-time passwords (OTPs) are commonly delivered to a mobile number of a user by a short message service (SMS) message. The conventional OTPs sent via the SMS message contain a text description and the numeric or alphanumeric string of characters that constitute the OTP. In general, the user receives the OTP as a short message service (SMS) message from a short number, a long number, or from an alphanumeric sender mask. Often the user does not recognize the short number, the long number, or the sender mask as belonging to a brand he is expecting to receive the OTP from. For example, the user receives the OTP short message service (SMS) message from a sender mask as shown in FIG. 1A, or from a short number as shown in FIG. 1B, or from a long number as shown in FIG. 1C. The conventional OTP SMS messages can thus sometimes be confusing to the user, and may also not be trustworthy. Hackers can also breach security of the OTP. Further, the user is required to copy the OTP and paste it into a different application, or into a web browser on the same or another user device or on another computer. Furthermore, if a user did not request the OTP, or does not recognize the sender, there is no easy way for the user to indicate a potentially fraudulent activity suspected by the user. Therefore, there is a long felt need to increase the security and trust of the OTP by adding a brand identity, for example, a brand name, a brand icon, and/or a brand logo of the sender, along, optionally with a verification mark, for example, a checkmark or a trust mark, to indicate the brand identity has been verified and can be trusted by the recipient.

The numeric or alphanumeric one-time password (OTP) is preceded and/or followed by text that describes the nature of the transaction being contemplated. The OTP can thus sometimes be confused with the surrounded text, and be difficult to identify. Therefore, there is a long felt need to distinguish the OTP string from the surrounding text.

Furthermore, the conventional one-time password (OTP) short message service message (SMS) does not provide an option to the user to convey either a confirmation of the transaction or to report a potentially fraudulent activity. Therefore, there is a long felt need for a rich one-time password (ROTP) message with an option to convey either the confirmation of the transaction, or report potentially fraudulent activity.

Hence, there is a long felt need for a method for creating and transmitting a rich one-time password (ROTP) message with the brand identity of a sender. Furthermore, there is a long felt need for a rich one-time password (ROTP) message with an option to convey either confirmation of a transaction or to report a potential fraud to the brand, or a developer on behalf the brand, who requested to send the ROTP message. Furthermore, there is a long felt need to distinguish an OTP string from the surrounding text.

SUMMARY OF THE INVENTION

The method disclosed herein addresses the above mentioned need for creating and transmitting a rich one-time password (ROTP) message with a brand identity of a sender, and optionally with a verification mark. Furthermore, the method disclosed herein addresses the need for a rich one-time password (ROTP) message with an option to convey either confirmation of a transaction or to report a potential fraud. Furthermore, the method disclosed herein addresses the need for distinguishing an OTP string from the surrounding text, for example, by using bold font, or colors, or graphics, for the OTP string.

The method disclosed herein describe sending rich one-time password (ROTP) messages on one or more data messaging channels or rich messaging channels, for example, rich communication services (RCS), WhatsApp, iMessage, Viber, Telegram, Messenger, Signal, or any other messaging channels that use data to communicate a message, or support rich messaging features such as one or more of images, videos, rich cards, carousels, and action buttons. The action buttons, such as suggested replies, suggested actions, or suggested chip lists, are buttons that a user can tap to send a response message. These data messaging channels or rich messaging channels are supported by a data messaging application on the user device, and a data messaging platform, such as RCS, WhatsApp, iMessage, Viber, etc. Most of these data messaging platforms support business messaging that enable brands or a developer on behalf of a brand, or an application on behalf of a brand, to send and receive messages over data to and from users of the data messaging applications. Some such as Signal do not currently support business messaging but may do so in the future. Some of these rich messaging platforms, for example, RCS, WhatsApp, iMessage, Viber identify the user by their mobile number. Others, for example, Messenger, allow users to use an identifier other than mobile number, but also permit users to link a mobile number with their account. As used herein, "channel" refers to SMS, RCS, WhatsApp, iMessage, Viber, etc. Also, as used herein "rich messaging channel", "data messaging channel", "data messaging application" and "rich messaging platform" refer to RCS, WhatsApp, iMessage, Viber, etc.

A method for creating and transmitting a rich one-time password (ROTP) message with a brand identity of a sender, and optionally a verification mark, are provided. The method employs a rich one-time password application (ROTPA) executable by at least one processor configured to execute computer program instructions for creating and transmitting the ROTP message. The ROTP message comprises a one-time password and a brand identity. In an embodiment, the ROTP further comprises a verification mark. The brand identity can comprise one or more of a brand name, a brand icon, or a brand logo of the brand involved in a transaction with the user. The ROTPA receives a request to create and transmit the ROTP message from a brand. The ROTPA creates and transmits the ROTP message to a mobile number of a user over a network. The ROTP message is sent over a data link comprising either mobile data or Wi-Fi. The ROTPA determines if the mobile number is enabled for data messaging, such as rich communication services (RCS), WhatsApp, iMessage, Viber, or any other data messaging application that can support ROTP messages to be transmitted to the mobile number via RCS, WhatsApp, iMessage, Viber, or any other data messaging application. For data messaging applications, for example Messenger, that may allow an identifier other than a mobile number, ROTPA determines if the mobile number of the user is linked to the data messaging application. The mobile number of the user receives the transmitted ROTP message. The ROTP message is delivered into a data messaging application, for example, Android Messages or Samsung Messages on a user device with a subscriber identity module (SIM) that represents the mobile number of the user, or on another data messaging application such as Apple iMessage, WhatsApp, Viber, etc. on a user device where the messaging application is registered with the mobile number of the user.

In an embodiment, the ROTP message further comprises a button to confirm a transaction, and a button to report potential fraud. The ROTPA receives a selection of a confirmation of the transaction or a report of a potentially fraudulent activity from the user device. The user conveys the confirmation of the transaction by selecting the confirm button, or responds with "Confirm". The OTP confirmation authenticates a user transaction and/or a user login. In another embodiment, the user conveys confirmation of the transaction by manually entering the OTP on the user device, or on another device of the user, or in an application or on a web page used to initiate a request for an OTP. The user who receives an unauthorized ROTP message may report the potentially fraudulent activity to the ROTPA by selecting the "report fraud" button to report potential fraud or responding with "Report Fraud". In another embodiment, the method described above is executed using one or more of an application program interface (API) designed for sending ROTP, an API designed for sending short message service (SMS) messages, a protocol designed for sending SMS messages (for example, Short Message Peer-to-Peer (SMPP) protocol), and a software development kit (SDK) designed for ROTPs. The API for sending SMS messages could be a pre-existing API for SMS messaging that is already in use. Similarly, the protocol for sending SMS messages could be a pre-existing protocol (for example, Short Message Peer-to-Peer (SMPP) protocol) that is already in use for SMS messaging. In another embodiment, it is possible to provide the ROTP message to the brand at the same or lower cost as a conventional SMS message.

BRIEF DESCRIPTION OF THE DRAWINGS

FIGS. 12A-12B exemplarily illustrates screenshots of a rich one-time password message service registration.

DETAILED DESCRIPTION OF THE INVENTION

Figure 1C:
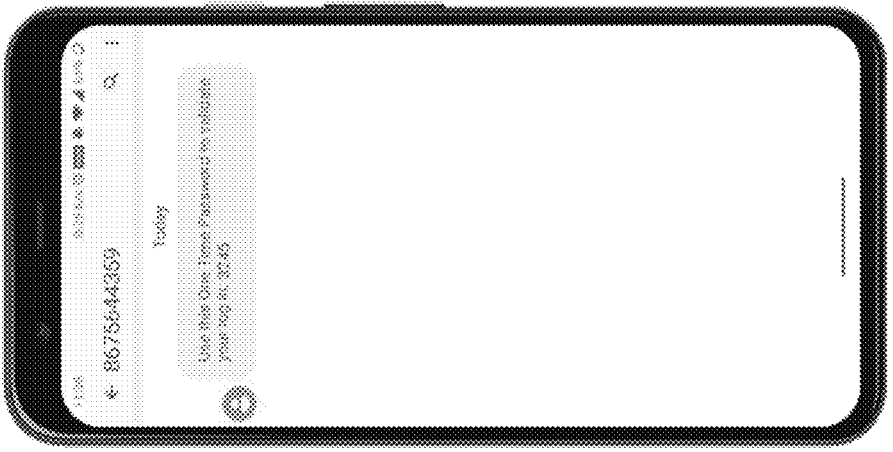
FIGS. 1A-1C (prior art) illustrate a one-time password short message service received from a number (which the user may not recognize) or from an alphanumeric sender mask.
Figure 1B:
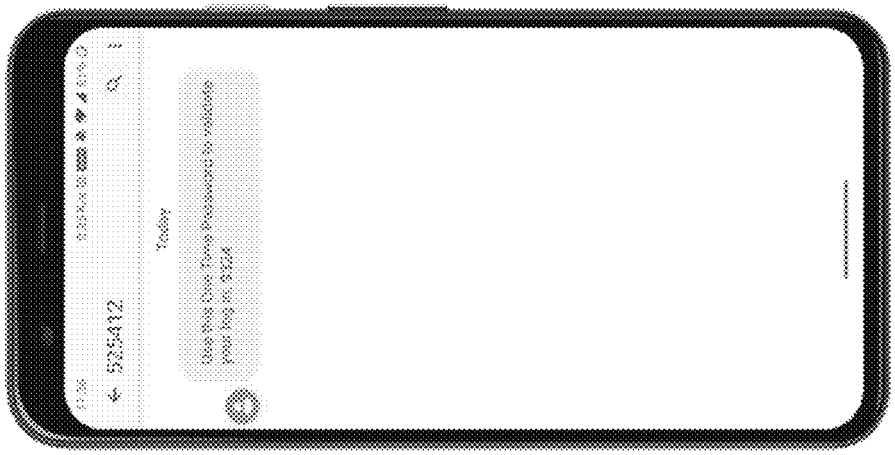
Figure 1A:
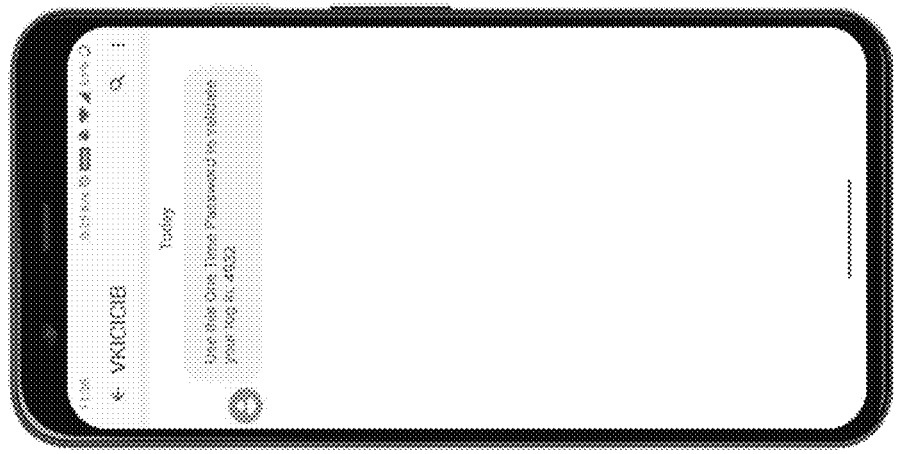

FIGS. 1A-1C (prior art) illustrate a one-time password short message service received from a number which the user may not recognize or from an alphanumeric sender mask. As explained above, there are several drawbacks in sending the one-time password using the one-time password short message service. The drawbacks are overcome by creating and sending a rich one-time password (ROTP) message.

Figure 2A:
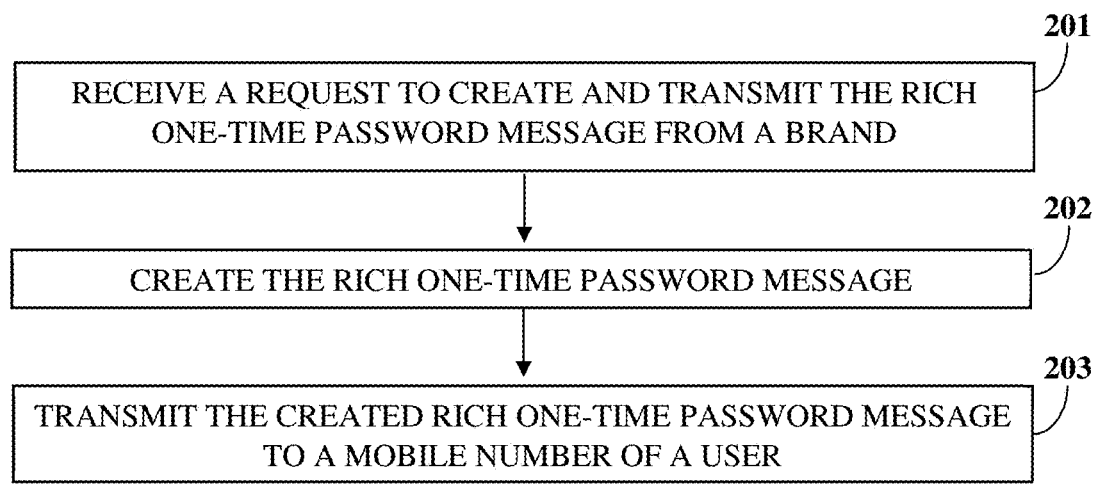
FIG. 2A illustrates a method for creating and transmitting a rich one-time password message.

FIG. 2A illustrates the method for creating and transmitting a rich one-time password (ROTP) message. As used herein, "rich one-time password message" refers to a message that comprises a one-time password (OTP), a brand identity, an optional text description, an optional verification mark, an optional button to confirm a transaction, and an optional button to report a potential fraud. The method employs a rich one-time password application (ROTPA) executable by at least one processor configured to execute computer program instructions associated with the creating and transmitting of the ROTP message. The ROTPA receives 201 a request to create and transmit the ROTP message from a brand, or a developer on behalf of a brand.

Also as used herein, "brand" refers to an enterprise or a division of an enterprise, or a brand used by the enterprise or an organization, that intends to send a one-time password to authenticate a user. Wherever reference is made to a brand taking or receiving an action, the reference refers to a developer or another person who takes or receives the action on behalf of the brand, or an application that is taking or receiving the action on behalf of the brand. In an embodiment, the ROTPA is implemented as a web based platform hosted on a server or a network of servers accessible via a network 5006, shown in FIG. 5. In another embodiment, the ROTPA is implemented in a cloud computing environment. Also, as used herein, "cloud computing environment" refers to a processing environment comprising configurable computing physical and logical resources, for example, networks, servers, storage, applications, services, etc., and data distributed over a network, for example, the internet. In another embodiment, the ROTPA is implemented as a cloud platform service also known as Platform as a Service (PaaS).

In an embodiment, the rich one-time password (ROTP) message comprises a one-time password, text description, and a brand identity. As used herein, "one-time password" refers to a numeric or an alphanumeric one-time password (OTP). Also, as used herein, "text description" refers to text that precedes and/or follows the OTP and describes the nature of the transaction being contemplated. The brand identity comprises, for example, one or more of a brand name, a brand icon, and a brand logo of the brand involved in a transaction with the user, as exemplarily illustrated in FIGS. 6-10D. In another embodiment, a verification mark, for example, a checkmark next to one or more of the brand name, the brand icon and the brand logo, indicates that the brand is verified, and can be trusted by the recipient of the ROTP message. The rich one-time password application (ROTPA) creates 202 and transmits 203 the ROTP message to a mobile number of a user. The ROTPA determines if the mobile number is enabled for rich communication services (RCS) and creates the ROTP message to be transmitted to the mobile number via RCS. The mobile number is enabled for RCS, if the user has an RCS capable client application installed on the user device, and can receive RCS messages sent to the mobile number. In another embodiment, the ROTPA determines if the mobile number is enabled for WhatsApp messages, and creates the ROTP message to be transmitted to the mobile number via WhatsApp. The mobile number is enabled for WhatsApp, if the user has the WhatsApp application installed on the user device, and can receive WhatsApp messages sent to the mobile number. In another embodiment, the ROTPA determines if the mobile number is enabled for one or more of rich messaging platforms, i.e., data messaging applications, for example, RCS, WhatsApp, iMessage, Viber, etc., and determines the type of ROTP message to be transmitted to the mobile number via the rich messaging platforms for which the mobile number is enabled. The ROTP message is sent over a data link, for example, mobile data or Wi-Fi. The ROTP message is delivered to a user device in the RCS client, in WhatsApp, or in another data messaging application that is registered with the mobile number of the user.

The user device associated with the mobile number receives the transmitted rich one-time password (ROTP) message, as shown in FIGS. 6-10D. In an embodiment, the user receives the ROTP message from a sender ID, for example, a sender named RichOTP, as exemplarily illustrated in FIGS. 6A-6D, 8A-8D, and 10A-10B. In another embodiment, the user receives the ROTP message from the brand's sender ID, for example, "Citibank" as exemplarily illustrated in FIGS. 7A-7D, 9A-9B, and 10C-10D.

The method described above is executed using one or more of an application program interface (API) designed for rich one-time passwords (ROTPs), an application program interface designed for sending short message service (SMS) messages, a protocol designed for SMS messages, and a software development kit (SDK) designed for ROTPs.

Figure 2B:
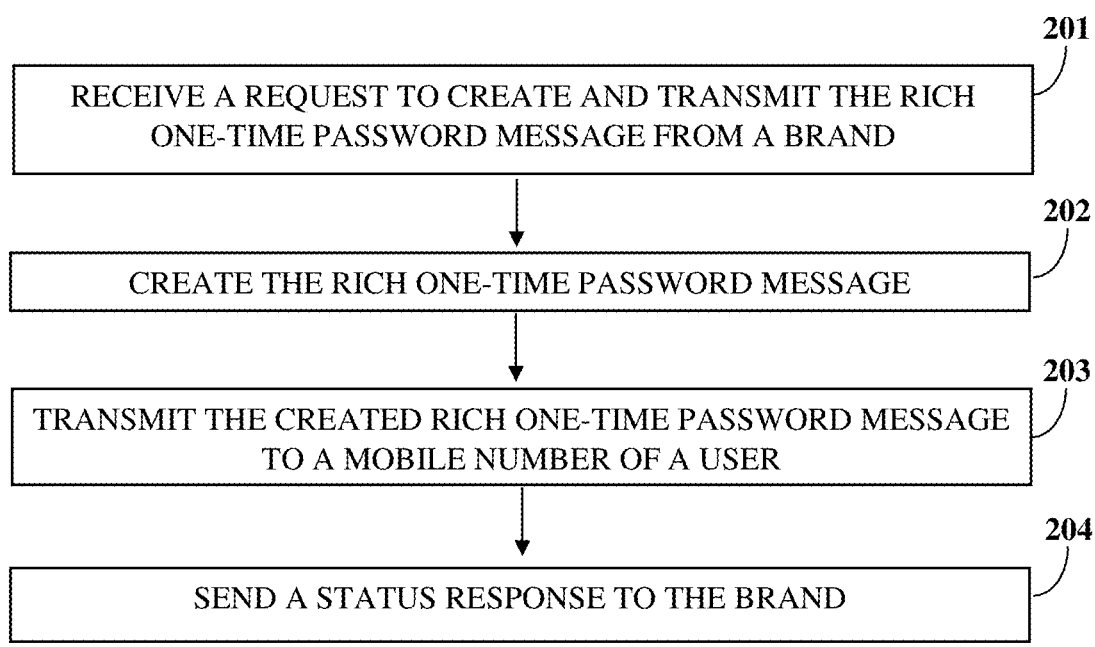
FIG. 2B illustrates an embodiment of the method for creating and transmitting a rich one-time password message.

FIG. 2B illustrates an embodiment of the method for creating and transmitting a rich one-time password message. The rich one-time password application (ROTPA) receives 201 a request to create and transmit the ROTP message from a brand, or a developer on behalf of a brand. The ROTPA creates 202 and transmits 203 the ROTP message to a mobile number of a user. The ROTPA further sends 204 a status response to the brand, or developer on behalf of the brand. The status response indicates one or more of the delivery of the rich one-time password (ROTP) message to the user, a timeout without delivery of the ROTP message, a confirmation of the ROTP message having been read, the rich messaging platform used to transmit the ROTP message, an indication if the mobile number of the user is not enabled for any of the rich messaging platforms and if the one-time password is sent as short message service (SMS) or not, etc.

Figure 2C:
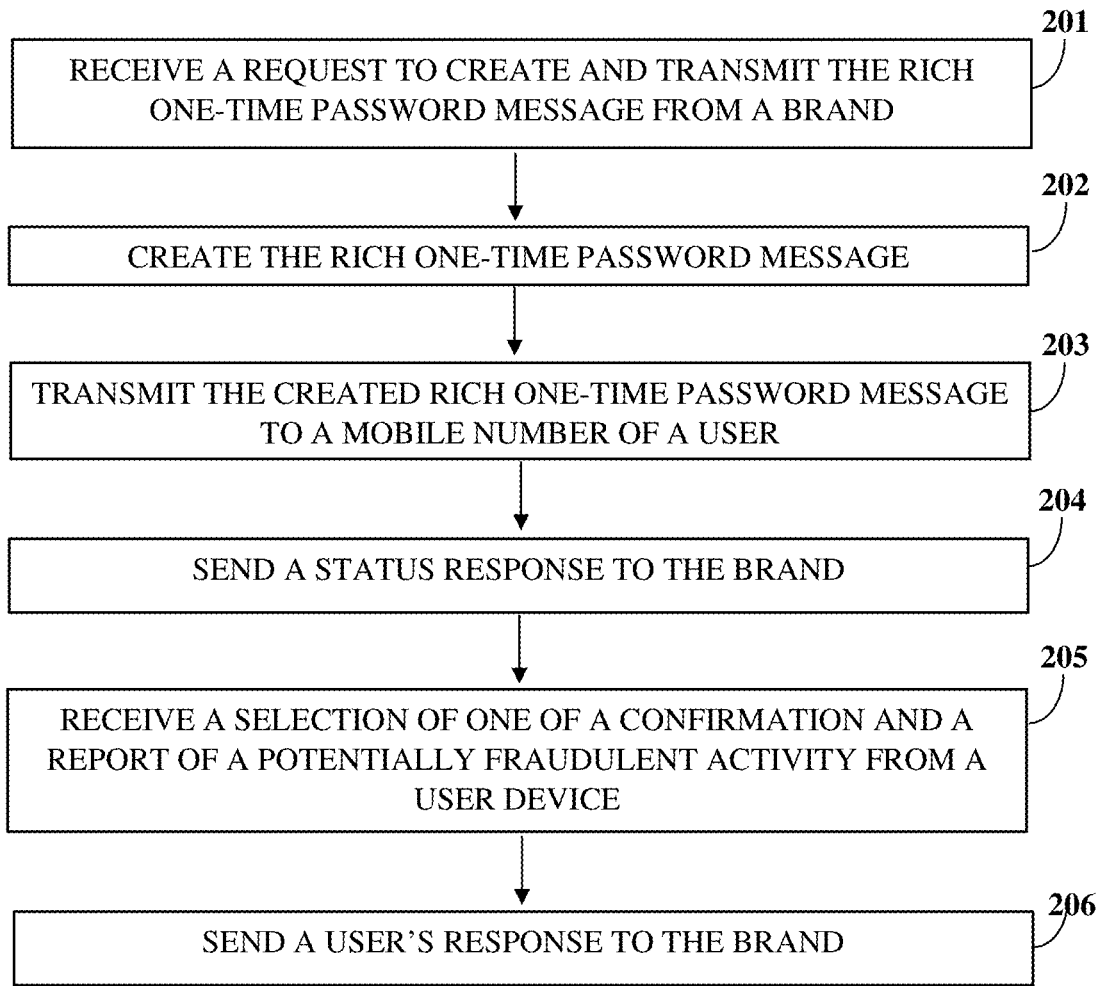
FIG. 2C illustrates another embodiment of the method for creating and transmitting a rich one-time password message.

FIG. 2C illustrates another embodiment of the method for creating and transmitting a rich one-time password message. The rich one-time password application (ROTPA) receives 201 a request to create and transmit the ROTP message from a brand, or a developer on behalf of a brand. The ROTPA creates 202 and transmits 203 the ROTP message to a mobile number of a user. The ROTPA sends 204 a status response to the brand, or developer on behalf of the brand. The ROTP message further comprises a button to confirm a transaction and a button to report a potential fraud. The rich one-time password application (ROTPA) receives 205 a selection of one of a confirmation and a report of a potentially fraudulent activity from the user device, as exemplarily illustrated in FIG. 2C. The user conveys the confirmation of the transaction by selecting the confirm button, or by responding with "Confirm", as exemplarily illustrated in FIGS. 6B, 6D, 7B, 7D, 8B and 8D. In another embodiment, the user confirms the transaction by manually entering the OTP on the user device, or on another device of the user, or in an application, or a web page from where the ROTP message was requested for purposes of authentication. In another embodiment, the user gets the option to copy the OTP, so that manual entry is facilitated. The transaction confirmation then authenticates one of a user transaction and a user login. The user conveys the potentially fraudulent activity by selecting the "report fraud" button to report a potential fraud or by responding with "Report Fraud" or "Unauthorized Access", as exemplarily illustrated in FIGS. 6C, 6D, 7C, 7D, and 9B. The reporting of a potentially fraudulent activity conveys the user's suspicion of a fraud attempt involving the transaction related to the ROTPA. The ROTPA sends 206 a user's response confirming or reporting potential fraud to the brand, or developer on behalf of the brand. In an embodiment, the status response and user's response are sent together to the brand, or developer on behalf of the brand.

Figure 2D:
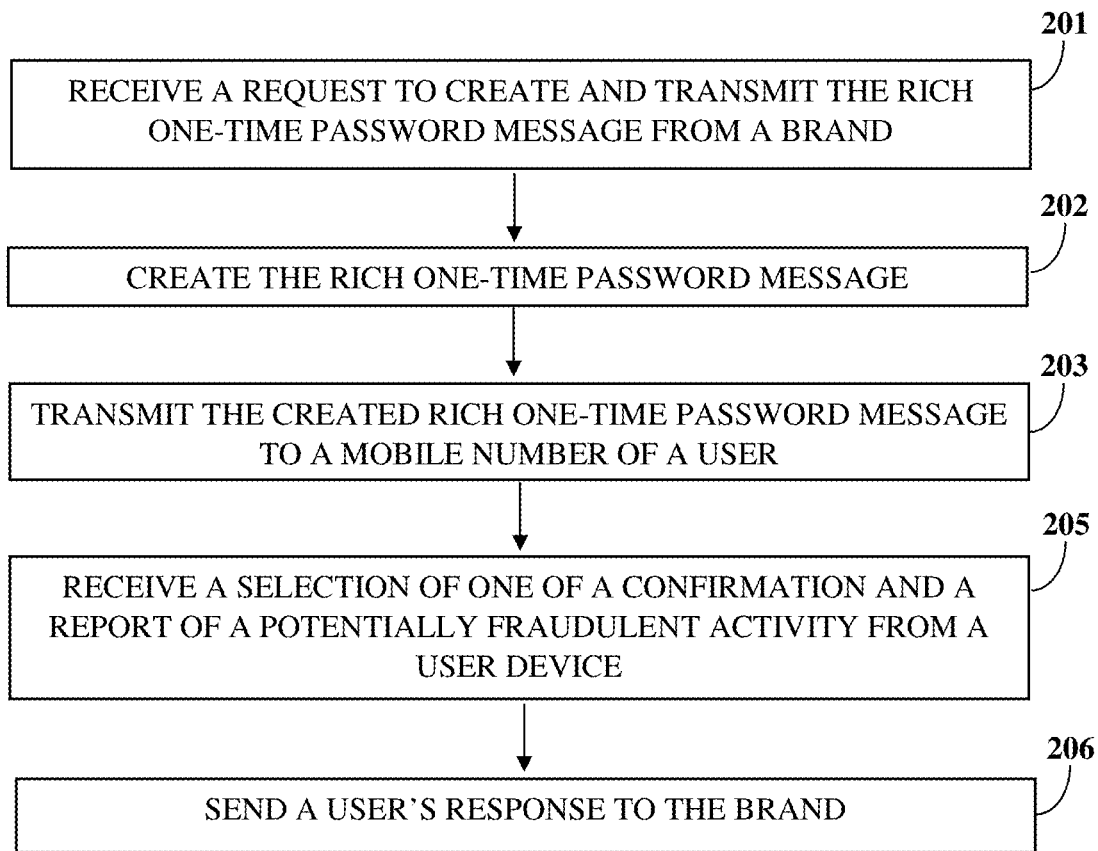
FIG. 2D illustrates another embodiment of the method for creating and transmitting a rich one-time password message.

FIG. 2D illustrates another embodiment of the method for creating and transmitting a rich one-time password message. The rich one-time password application (ROTPA) receives 201 a request to create and transmit the ROTP message from a brand, or a developer on behalf of a brand. The ROTPA creates 202 and transmits 203 the ROTP message to a mobile number of a user. The ROTPA receives 205 a selection of one of a confirmation and a report of a potentially fraudulent activity from the user device. The ROTPA sends 206 a user's response confirming or reporting potential fraud to the brand, or developer on behalf of the brand.

Figure 3:
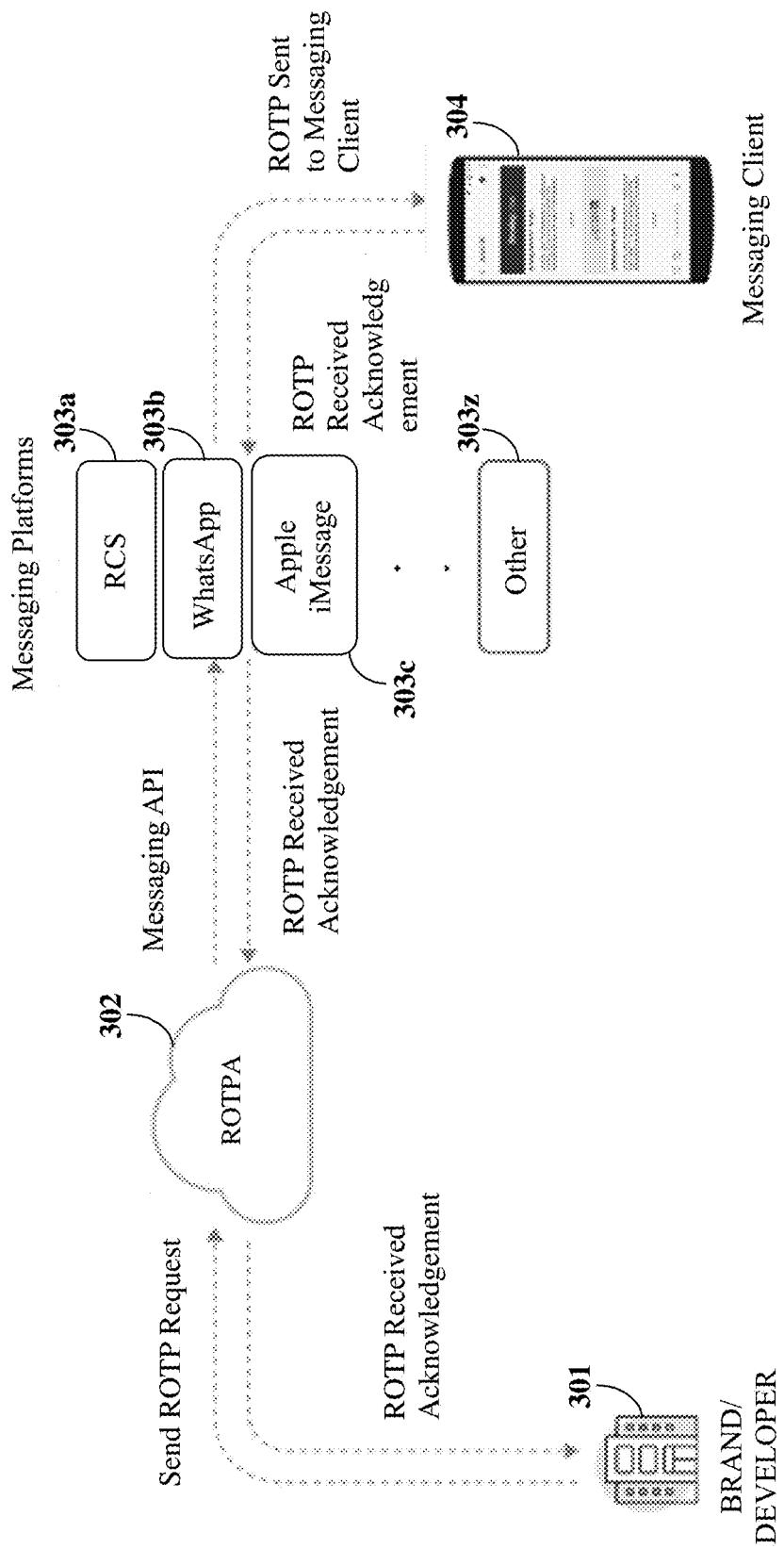
FIG. 3 exemplarily illustrates a process flow for creating and transmitting a rich one-time password message by a brand, or a developer on behalf of a brand.

FIG. 3 exemplarily illustrates a process flow for creating and transmitting a rich one-time password (ROTP) message by a brand, or a developer on behalf of the brand. A brand/developer 301 accesses a rich one-time password application (ROTPA) 302 to create and transmit the ROTP message to a mobile number of a user. In this embodiment, the ROTPA 302 is configured as a cloud platform implemented as a service, accessible by using application programing interfaces (APIs). The brand/developer 301 can chose to transmit the ROTP message from a verified sender ID, for example, the sender id "RichOTP", without the need to use the brand's own sender-ID, as exemplified in FIGS. 6-6D, 8A-8D, and 10A-10B. In another embodiment, one or more brands choose to transmit the ROTP message from a verified sender ID such as "RichOTP", whereas one or more other brands can choose to transmit the ROTP message from another verified sender ID such as "Secure OTP", whereas one or more other brands can choose to transmit the ROTP message from another non-verified sender ID such as "Universal OTP". The brand/developer 301 also chooses to transmit the ROTP message from its own sender ID, such as its own brand name, as exemplified in FIGS. 7A-7D, 9A-9B, and 10C-10D. In another embodiment, the brand's own sender ID is a verified sender ID, as exemplified in FIGS. 7A-7D, 9A-9B, and 10C. In another embodiment, the brand's own sender ID is not a verified sender ID, as exemplified in FIG. 10D. The sender ID used to transmit ROTP is visible to the user as an alphanumeric string, as a phone number, as a short code, or a combination thereof. The brand/developer 301 sends a request to create a ROTP message to the ROTPA 302. The ROTPA 302 creates the ROTP message and transmits the ROTP message from the sender-ID specified by the developer, to the mobile number of the user using a messaging platform, for example, Rich Communication Services (RCS) 303a, WhatsApp 303b, Apple iMessages 303c, other platform 303z, etc.

The rich one-time password application (ROTPA) 302 determines rich data messaging capabilities of one or more of a plurality of messaging platforms 303a to 303z for which the mobile number of the user is enabled and maps a request for a rich one-time password from the brand/developer 301 to messaging platform specific capabilities, to create and transmit the rich one-time password (ROTP) message to the mobile number of the user. The user device 304 is associated with the mobile number of the user. In an embodiment, the ROTPA 302 determines if the mobile number of the user is enabled for rich communication services (RCS) and creates the ROTP message to be transmitted to the mobile number of the user via the RCS channel. For example, a channel such as RCS supports rich elements such as carousel, suggested response and suggested chiplist that can be used to implement "buttons" for user actions such as copy, confirm, complete transaction, report potential fraud, unauthorized access, did not request, and unrecognized transaction, where a user taps on the "button" to complete the action without leaving the messaging client, as exemplarily illustrated in FIGS. 6A-6D, 7A-7D, 8B-8D, and 9B.

In another embodiment, the rich one-time password application (ROTPA) 302 determines if the user is enabled for WhatsApp and creates the rich one-time password (ROTP) message to be transmitted to the mobile number of the user via WhatsApp. For example, messaging channels such as WhatsApp may support delivery of images for the brand's logo, but may not support other rich elements to implement buttons that users can click to complete the action, as exemplarily illustrated in FIG. 9A. For such channels, the ROTPA 302 sends a menu of options to confirm and to report fraud actions, such as "send or type 1 to confirm, 2 to report fraud", as exemplarily illustrated in FIG. 10B-10D. A user types the response to complete the action. Furthermore, ROTPA 302 also sends weblinks to confirm and to report fraud actions. The user clicks on the weblink to complete the action, leading to a web browser being opened. If the WhatsApp channel evolves to include rich elements such as buttons, then the ROTPA 302 incorporates buttons into the ROTP message.

In another embodiment, the rich one-time password application (ROTPA) 302 determines if the user is enabled for one or more of rich messaging platforms, for example, RCS, WhatsApp, iMessages, Viber, etc., and determines a type of the rich one-time password (ROTP) message to be transmitted to the mobile number of the user via the enabled rich messaging platforms.

The rich one-time password application (ROTPA) 302 enables the brand/developer 301 to transmit the rich one-time password (ROTP) message to the mobile number of the user over data, to a data messaging client, for example, a Rich Communication Services (RCS) client, a WhatsApp client, an iMessage client, or a Viber client. The ROTP message is sent over a data link comprising either mobile data or Wi-Fi. The ROTP message is delivered into a messaging client i.e., data messaging application, on a user device 304 associated with the mobile number of the user. The ROTPA 302 monitors the delivery of the ROTP message to the user. Depending on the preference of the brand/developer 301, the ROTPA 302 delivers the ROTP to the user via a second platform if there is delivery failure or delay in delivery of the rich one-time password message to the user via a first platform. In another embodiment, the ROTPA 302 delivers the ROTP to the user via more than one platform to increase the reliability of delivery of the rich one-time password. The second platform may be a short messaging service (SMS) platform, or another of the data messaging platforms that permit ROTP. In an embodiment the routing logic of the ROTPA 302 comprises determining if the user identified by the mobile number is available on one or more of the rich messaging channels, for example, RCS, WhatsApp, Viber, etc. Furthermore, ROTPA 302 determines developer's preference in terms of order of the rich data messaging channel to be used to send the ROTP, and user's availability on one or more rich messaging channels.

Furthermore, where the button to confirm a transaction and the button to report a potential fraud are provided in the rich one-time password (ROTP) message, the rich one-time password application (ROTPA) 302 receives an acknowledgement regarding selection of one of the options from the user device 304 of the user. The ROTPA 302 conveys the received selection of one of the confirmation and the report fraud from the user device 304 of the user to the brand/developer 301. In another embodiment, the user can convey confirmation of the OTP by manually entering the OTP on the user or on another device.

In another embodiment, the method described above is executed using an application program interface provided to the developer 301 by the ROTPA 302.

Figure 4:
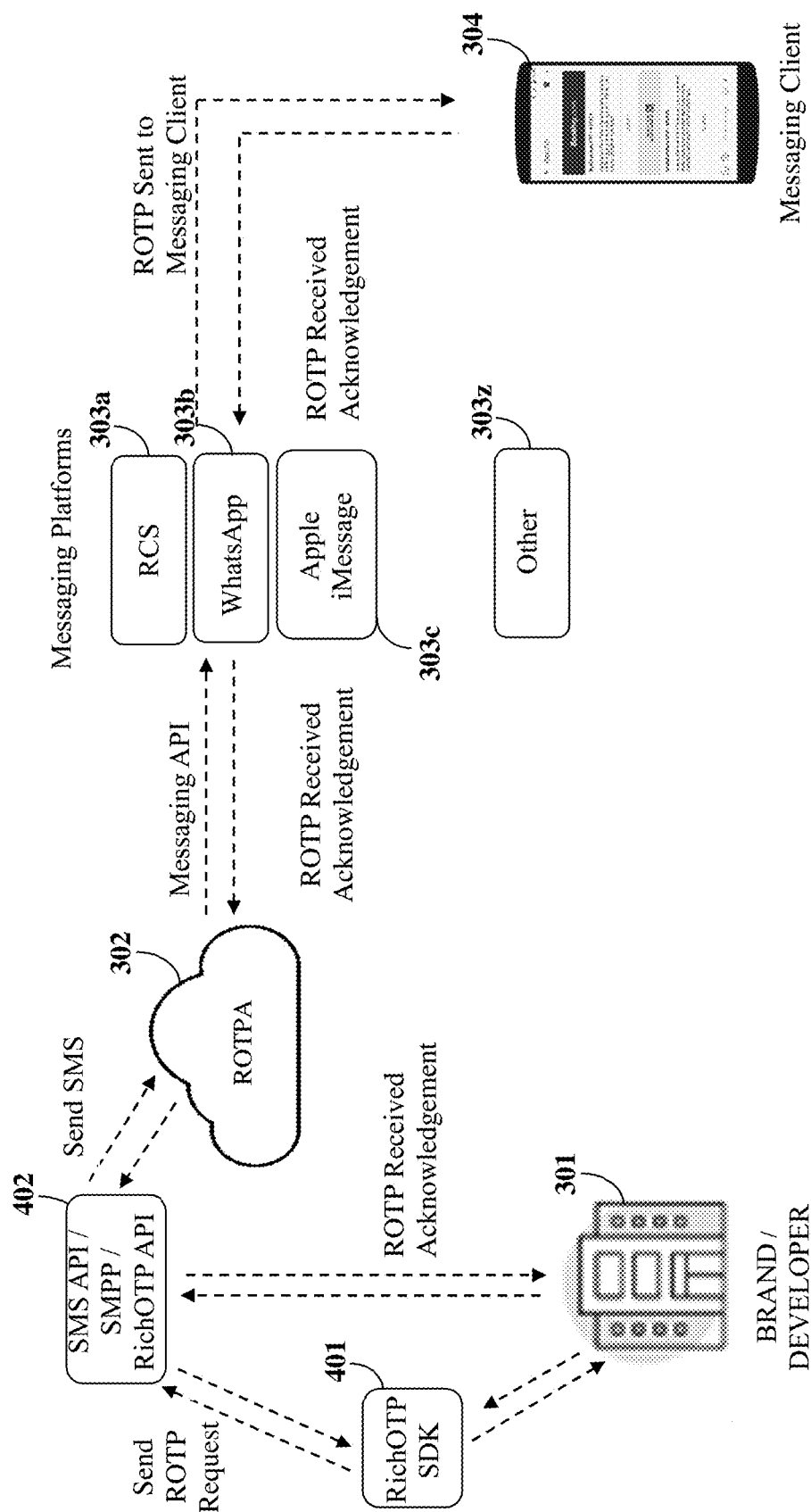
FIG. 4 exemplarily illustrates a process flow for creating and transmitting a rich one-time password (ROTP) message by a brand, or a developer on behalf of a brand using one or more of an application program interface (API) designed for sending ROTP message, an API for sending short message service (SMS) messages, and a protocol for short messaging service.

FIG. 4 exemplarily illustrates a process flow for creating and transmitting a rich one-time password (ROTP) message by a brand, or a developer on behalf of a brand using one or more of an application program interface (API) designed for sending ROTP message, for example, RichOTP API, an API for sending short message service (SMS) messages, a protocol for short messaging service, for example, Short Message Peer-to-Peer (SMPP) protocol, web services, or a Representational state transfer (REST) (API), and a software development kit (SDK) designed for ROTPs. For example, a brand or a developer on behalf of the brand 301 uses one of a SMS API, a SMPP, and a RichOTP API 402 for sending an SMS message. In another embodiment, the brand/developer 301 uses the software development kit (SDK) 401 designed for ROTPs, for example, RichOTP SDK and one of the SMS API, the SMPP, and the RichOTP API 402 for sending an SMS message. The rich one-time password application (ROTPA) 302 receives the request to send an SMS message using one of the SMS API, the SMPP, and the RichOTP API 402. The ROTPA 302 parses the content of the SMS message received from the SMS API 302, and identifies whether the received SMS is for a one-time password message, or some other message. The identification is performed by analyzing the received SMS message to determine if the SMS message is used to send a one-time password, wherein the analysis is based on pattern matching, or on machine learning techniques. If the received SMS message is identified as a one-time password message, then the ROTPA 302 creates a rich one-time password (ROTP) message, and transmits the created ROTP message to the mobile number of a user. If the received SMS message is not identified as a one-time password (OTP) message, the ROTPA 302 transmits the received SMS message as an SMS message. In another embodiment, the ROTPA 302 may inform the brand/developer 301 that the message is not an OTP message, so that brand/developer 301 may take alternative action of its choosing.

Furthermore, the rich one-time password application (ROTPA) determines if the mobile number supports delivery of rich messages or does not support delivery of rich messages, and transmits the identified one-time password message as one of a rich one-time password (ROTP) message, or as a standard short message service (SMS) message. In an embodiment, the brand or the developer on behalf of the brand, adds optional support for confirmation and/or report fraud actions, by implementing the callback methods for these actions, even when using an existing SMS application program interface (API).

Figure 5:
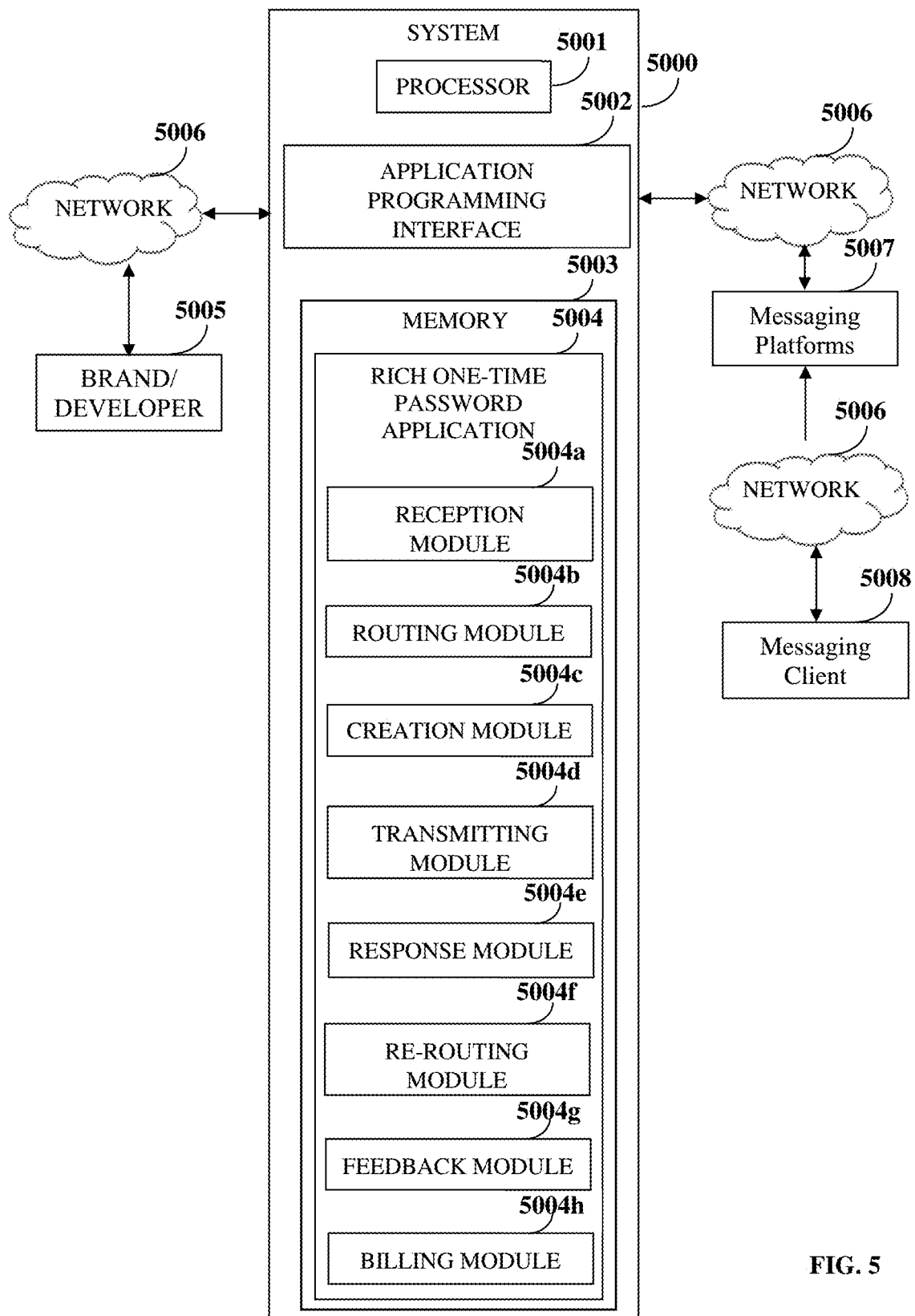
FIG. 5 exemplarily illustrates a computer implemented system for creating and transmitting a rich one-time password message.
Figures 6A, 6B:
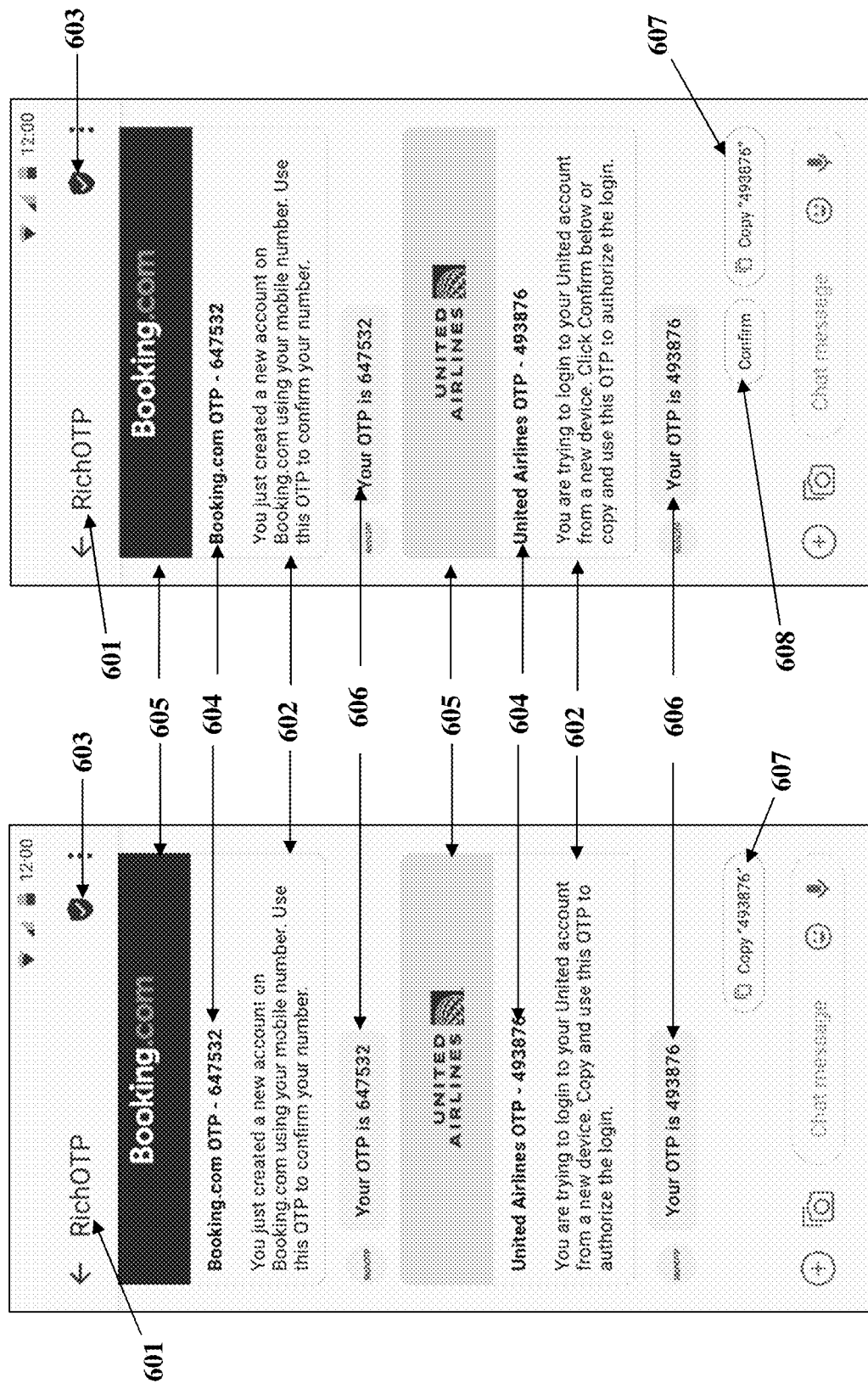
FIGS. 6A-6D exemplarily illustrates screen shot of an embodiment of a rich one-time password message received by a user from a verified sender ID, such as the sender ID "RichOTP", with the brand identity of each brand sending a rich one-time password message.
Figures 6C, 6D:
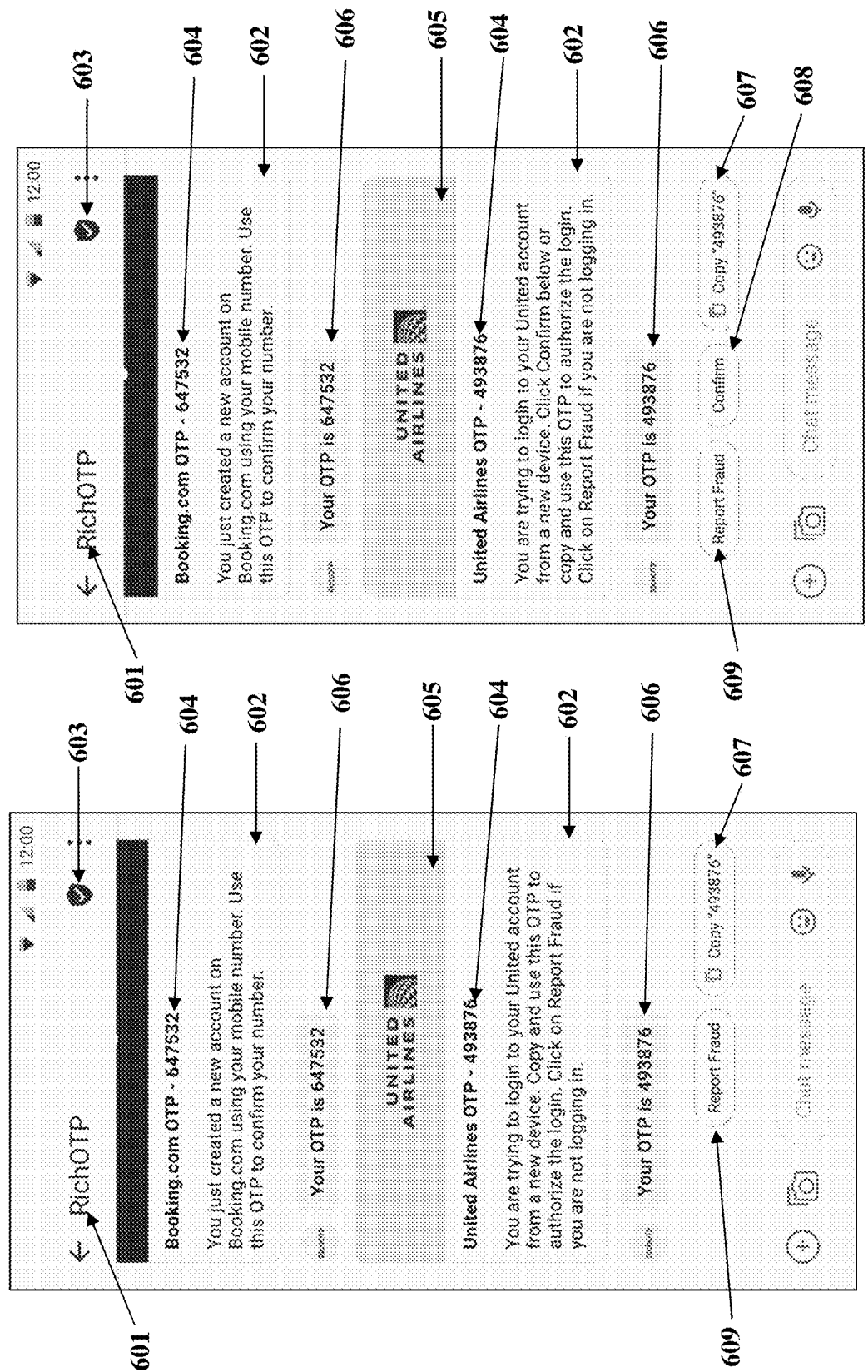

FIG. 5 exemplarily illustrates a computer implemented system 5000 for creating and transmitting a rich one-time password message. The computer implemented system 5000 disclosed herein comprises a processor 5001, an application program interface 5002 designed for rich one-time passwords, and a non-transitory computer readable storage medium such as a memory unit 5003 for storing programs and data. The non-transitory computer readable storage medium 5003 is communicatively coupled to the processor 5001. The non-transitory computer readable storage medium 5003 is configured to store a rich one-time password application (ROTPA) 5004 executable by the processor 5001. The non-transitory computer readable storage medium 5003 stores respective modules 5004*a*, 5004*b*, 5004*c*, 5004*d*, 5004*e*, 5004*f*, 5004*g*, and 5004*h* of the rich one-time password application (ROTPA) 5004 as exemplarily illustrated in FIG. 5. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal.

The rich one-time password application (ROTPA) 5004 is configured to manage actions associated with creating and transmitting the rich one-time password (ROTP) message. The ROTP message comprises a one-time password and a brand identity. The brand identity comprises one or more of a brand name, a brand icon, a brand logo of the brand involved in a transaction with the user, as exemplarily illustrated in FIGS. 6A-10D. The ROTPA 5004 comprises a reception module 5004*a*, a routing module 5004*b*, a creation module 5004*c*, a transmitting module 5004*d*, a response module 5004*e*, a re-routing module 5004*f*, a feedback module 5004*g*, and a billing module 5004*h*. The reception module 5004*a* is configured to receive a request to create and transmit the ROTP message from a brand, or a developer on behalf of a brand 5005. The brand comprises an enterprise or a division of an enterprise, or a brand used by the enterprise or an organization, that intends to send a one-time password to authenticate a user. Also, wherever a reference is made to a brand taking or receiving an action, the reference refers to a developer or another person who takes or receives the action on behalf of the brand, or an application that is taking or receiving the action on behalf of the brand. The creation module 5004*c* is configured to create the ROTP message. The transmitting module 5004*d* is configured to transmit the created ROTP message to a mobile number of a user. The routing module 5004*b* is configured to determine if the mobile number is enabled for one or more of multiple rich messaging platforms, and the creation module 5004*c* is configured to determine the type of the ROTP message to be transmitted to the mobile number via the rich messaging platforms 5007, and to create the appropriate ROTP message. In an embodiment, the routing module 5004*b* is configured to determine if the mobile number is enabled for rich communication services (RCS), and the creation module 5004*c* is configured to create the ROTP message to be transmitted to the mobile number via rich communication services. In an embodiment, the routing module 5004*b* executes the RCS contacts capability check command for the mobile number to determine if the mobile number is enabled for RCS.

In another embodiment, the routing module 5004*b* is configured to determine if the mobile number is enabled for WhatsApp and the creation module is configured to create the ROTP message to be transmitted to the mobile number via WhatsApp. In an embodiment, the routing module 5004*b* executes the WhatsApp contacts command for the mobile number to determine if the mobile number is enabled for WhatsApp. In another embodiment, the creation module 5004*c* is configured to transmit a standard short message service message to the mobile number of the user if the routing module 5004*b* determines that the mobile number is not enabled for any of the rich channels, for example, RCS, WhatsApp, iMessage, Viber, etc. The ROTP message is sent over a network 5006. The network 5006 is, for example, the internet, a wireless network, a mobile telecommunication network, or any combination thereof. The ROTP message is delivered into a default messaging application such as messaging client 5008 on the user device with a subscriber identity module that represents the mobile number of the user, or the ROTP message is delivered into a data messaging application 5008 on the user device that is registered to the mobile number of the user.

The input for the creation and transmission of the rich one-time password (ROTP) message is received from a rich one-time password application (ROTPA) program interface (API) 5002 or an API for short messaging service (SMS) messaging. In an embodiment, the API 5002 receives a one-time password (OTP) message along with the mobile number of the user and the identifier of the ROTP template created by the brand or the developer on behalf of the brand. The routing module 5004*b* determines if the mobile number of the user is enabled for one or more of rich messaging platforms 5007 and other data messaging applications, for example, RCS, WhatsApp, iMessage, Viber, etc. The creation module 5004*c* translates the OTP message to ROTP message based on the rich messaging platform 5007 determined by the routing module 5004*b* and the identified ROTP template. The transmitting module 5004*d* transmits the ROTP message to the mobile number via one or more of rich messaging platforms 5007 and other data messaging applications.

In an embodiment, the application program interface (API) 5002 receives a short message service (SMS) message from a SMS application programming interface. The rich one-time password application (ROTPA) 5004 parses the received SMS message. The ROTPA 5004 identifies whether the received SMS message is a one-time password (OTP) message, or a standard SMS message. The identification is performed by analyzing the received SMS message to determine if the SMS message is being used to send a one-time password. The analysis is based on pattern matching, or on machine learning techniques. The ROTPA 5004 determines if the mobile number is enabled for one or more of rich messaging platforms and other data messaging applications, and determines a type of rich one-time password (ROTP) message to be transmitted to the mobile number via one or more of rich messaging platforms and other data messaging applications. The ROTPA 5004 creates a ROTP message if the received SMS message is identified as the one-time password message. The ROTPA 5004 transmits the created ROTP message to a user device of a user. The ROTPA 5004 creates a standard SMS message if the received SMS message is not identified as the one-time password message. The ROTPA 5004 transmits the created standard SMS message to a user device via one or more of rich messaging platforms.

The transmitted rich one-time password (ROTP) message is received by the user device associated with the mobile number, as exemplarily shown in FIGS. 6A-10D. The ROTP message is delivered from a verified sender ID, such as a RichOTP, as exemplarily illustrated in FIGS. 6-6D, 8A-8D, and 10A-10B, or from sender ID built by a brand that is sending the ROTP message, for example, Citibank as exemplarily illustrated in FIGS. 7A-7D, 9A-9B, and 10C. In an embodiment, the ROTP message further comprises one or more of a button to confirm a transaction, and a button to report a potential fraud. The response module 5004*e* is configured to receive the delivery status, including successful delivery and delivery failure, the read receipt, and to receive a selection of a confirmation or a report of a potentially fraudulent activity from the user device. The feedback module 5004*g* is configured to send the delivery status, the read status, the timeouts, and the user selection to the brand, or the developer on behalf of the brand. The user conveys the confirmation of the transaction by selecting the "confirm" button or by responding with "Confirm", as exemplarily illustrated in FIG. 8B. The user conveys the potentially fraudulent activity by selecting the "report fraud" button or by responding with "Report Fraud", as exemplarily illustrated in FIG. 7D. The reporting of a potentially fraudulent activity conveys a suspected fraud attempt involving the transaction to the rich one-time password application 5004. The feedback module 5004*g* is configured to process an action corresponding to the status and selection received by the reception module 5004*a*. In an embodiment, the feedback module 5004*g* is configured to provide feedback to the brand about the selection received by the response module 5004*e*, by sending a callback of the user action to the brand 5005 over the application programming interface 5002. The brand 5005 is free to process the feedback received from the ROTPA about the user actions, and authenticate the user for one of confirmation, or take some other action in response to the user reporting a potentially fraudulent activity involving the transaction.

The feedback module 5004*g* also provides feedback to the brand/developer 5005 about the delivery status and the read receipt of the rich one time password (ROTP) message, to allow the brand to take appropriate action. For example, if the ROTP is read, the feedback module 5004*g* informs the brand/developer 5005 that the ROTP has been read, so that the brand/developer 5005 can incorporate that knowledge into its authentication method. For example, the brand/developer 5005 may not want to authenticate the transaction until after getting the feedback that the ROTP has been read.

In another embodiment, the feedback module 5004*g* is configured to provide feedback to the brand/developer 5005 about the rich messaging platform used to send the ROTP to the user. In another embodiment, the feedback module 5004*g* is configured to provide feedback to the brand/developer 5005 if the routing module 5004*b* determines that the mobile number is not enabled for any of the rich channels, and the brand/developer 5005 has not chosen the option to transmit OTP as a standard short message service by ROTPA, thus allowing the brand/developer 5005 to take an alternative action, such as sending the OTP as a standard short message service on its own.

In another embodiment, the user conveys said confirmation of the one-time password by manually entering the one-time password on the user device or on another device of the user, or in an application, or on a web page used to request the ROTP message. The transaction confirmation enables the brand to authenticate a user transaction and/or a user login.

The routing module 5004*b* is configured to determine rich data messaging capabilities of a plurality of messaging platforms 5007, and the creation module 5004*c* maps a request from a developer 5005 to messaging platform 5007 specific capabilities, to transmit the rich one-time password (ROTP) message to the user device. The creation module 5004*c* is configured to translate the request for an ROTP message into an ROTP message that can be delivered to the messaging platform 5007 determined by the routing module 5004*b*, using information in the ROTP template defined by the brand, or a developer on behalf of the brand. The response module 5004*e* is configured to monitor the delivery of the ROTP message to the user, and user actions in response to the ROTP message. The re-routing module 5004*f* is configured to potentially deliver the ROTP message to the user via a second platform if there is delivery failure or delay in delivery of the ROTP message to the user via a first platform. In an embodiment the re-routing module 5004*f* is configured to transmit the ROTP message via multiple platforms to increase the overall chances of successful delivery of the ROTP message. In an embodiment, the ROTP message is delivered to the user via WhatsApp if the ROTP message is not delivered over rich communication service (RCS) within the predetermined time interval. In another embodiment, the ROTP message is delivered to the user as a one-time password (OTP) message via short messaging service (SMS) if the ROTP message cannot be delivered over any rich messaging platforms within the predetermined time interval. In another embodiment, the re-routing module 5004*f* is configured to revoke the ROTP message from the first messaging platform before attempting to deliver it over the second messaging platform. Revoking the ROTP message from the first messaging platform is helpful to avoid user getting duplicate ROTP message, and may also help avoid additional charges for delivery over multiple messaging platforms. Thus, the second platform is another data messaging platform, or a short messaging service platform. The re-routing module 5004*f* uses creation module 5004*c* and transmitting module 5004*d* to create and deliver the ROTP message to the user via a second platform. In an embodiment, the re-routing module 5004*f* is configured to monitor the delivery of the ROTP message to the user, via the second platform. The re-routing module 5004*f* is further configured to deliver the ROTP message to the user via one or more of a third platform and a fourth platform if there is delivery failure or delay in delivery of the ROTP message to the user via the second platform. The creation module 5004*c* is configured to translate the OTP message to the ROTP message to be transmitted to the mobile number based on the selected one or more of the second platform, the third platform and the fourth platform and the ROTP template defined by the brand, or developer on behalf of the brand.

The billing module 5004*h* is configured to charge the brand/developer a fee for creating and transmitting the rich one-time password (ROTP) message to the user device. Data messaging platforms, for example, RCS, WhatsApp, iMessage, Viber, etc., may charge a fee for application-to-person (A2P) messages, that could be at a premium, or lower than, the fee for a short messaging service (SMS) message. Therefore, when the ROTP is sent out to the mobile number of the user, the ROTP would normally be charged an A2P message fee applicable to the data messaging platform used to send the ROTP. Further, some data messaging platforms may charge a per session fee in lieu of per message fee when user responds to the ROTP. However, there may be a need to charge the ROTP at a price different from the per A2P message fee or the per session fee charged for sending other A2P messages, or for other sessions on the data messaging platforms. The ROTPA keeps track of the number of ROTP messages sent, confirmations or fraud reports received, and enables the billing module 5004*h* to charge the ROTP message in a way that is different from standard A2P and session pricing. This help in the implementation of flexible pricing for ROTP messages sent by brands. FIGS. 6A-6D exemplarily illustrates screen shots of another embodiment of a rich one-time password (ROTP) message received by a user from a verified sender ID 601, for example, RichOTP, with the brand identity of each brand sending a ROTP message. The rich one-time password application (ROTPA) determines if the user is enabled for rich communication services (RCS) and determines the type of ROTP message to be transmitted to the mobile number of the user. The ROTP message comprises a message 602 containing the reason and context for sending the OTP to the user along with instructions, a verification mark 603, a brand name with a one-time password (OTP) 604, a logo 605 of the brand, for example, Booking.com and United Airlines, involved in a transaction with a user. Furthermore, the channel such as RCS supports rich elements such as rich cards, carousels, suggested actions, suggested responses, and suggested chiplists that can be used to implement "buttons" for user actions such as copy 607, confirm 608, report fraud 609, and "Unauthorized Access" 610 where user taps on the "button" to complete the action without leaving the messaging client, as exemplarily illustrated in FIG. 6A-6D. Furthermore, for the convenience of the recipient, the one-time password (OTP) of the ROTP is displayed as part of the message "Your OTP is 647532" 606. In another embodiment, the message from the brand sending the one-time password refers to the OTP with a different term such as a password, a passcode, a token, a personal identification number (PIN), a security code, and a security token, for example, "Your PIN is 647532".

Figures 7A, 7B:
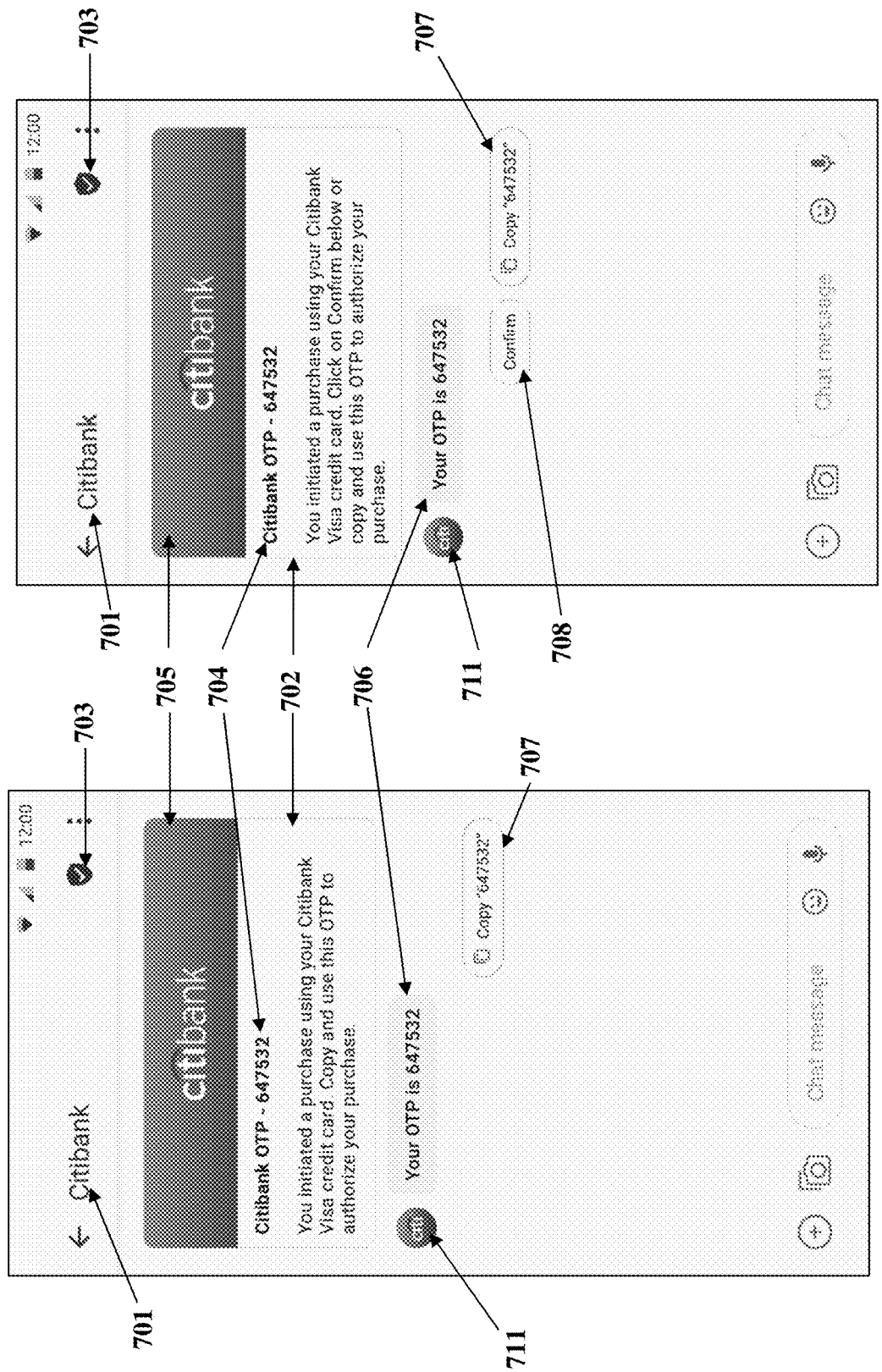
FIGS. 7A-7D exemplarily illustrates screen shots of another embodiment of a rich one-time password message received by a user from a verified sender ID of the brand, such as the sender ID "Citibank.
Figure 7D:
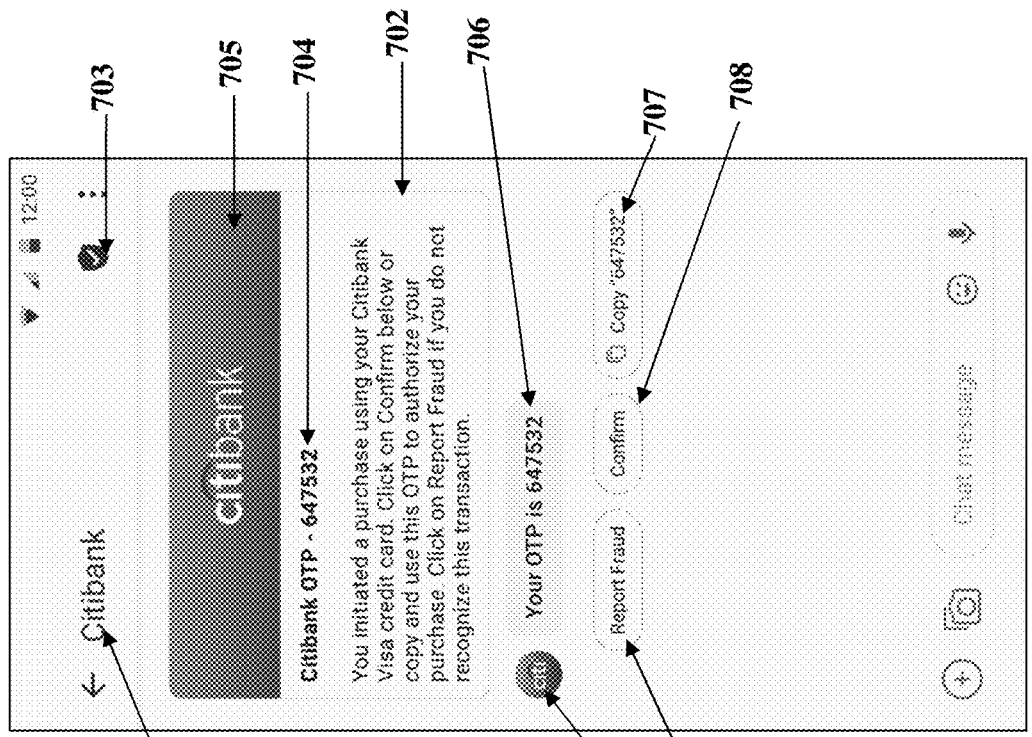
Figure 7C:
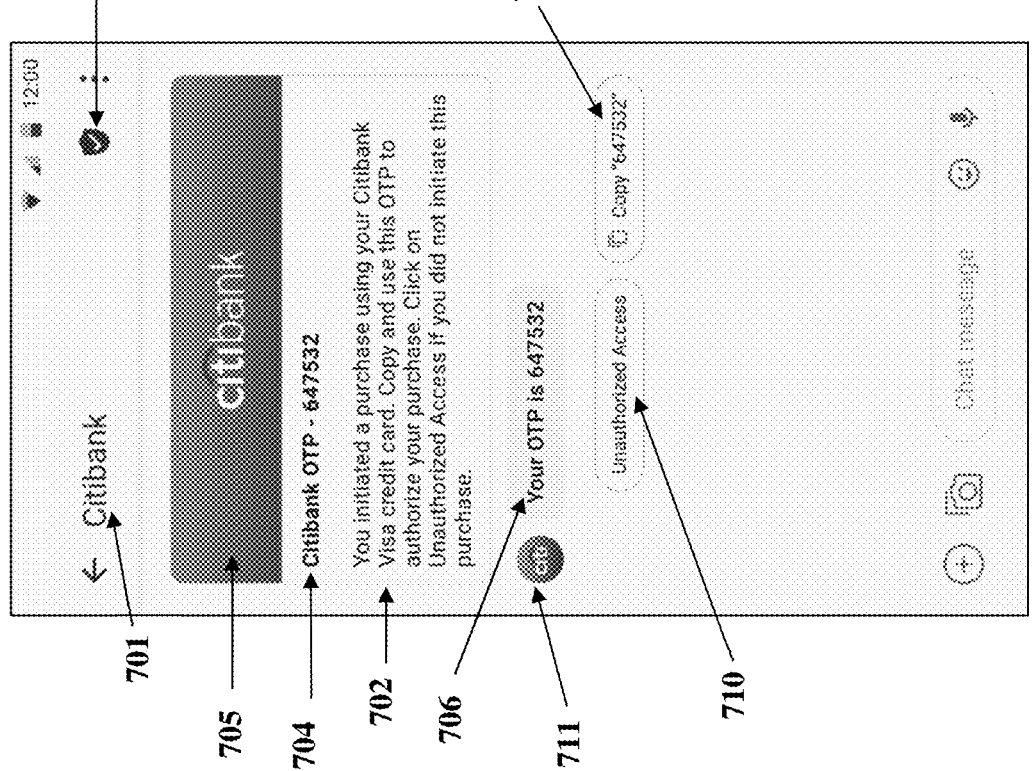

FIGS. 7A-7D exemplarily illustrates screen shots of another embodiment of a rich one-time password (ROTP) message received by a user from a verified sender ID 701 of brand, for example, Citibank. FIG. 7A exemplarily illustrates a first embodiment of the ROTP message comprising a message 702, a verification mark 703, a brand name with a one-time password (OTP) 704, a brand logo 705, and brand icon 711, of the brand involved in a transaction with a user, the one-time password (OTP) of the ROTP (displayed as part of the message "Your OTP is 647532" 706), and copy button 707. FIG. 7B exemplarily illustrates a second embodiment of the ROTP message comprising a message 702, a verification mark 703, a brand name with a one-time password (OTP) 704, a brand logo 705, a brand icon 711 of the brand involved in a transaction with a user, the one-time password (OTP) of the ROTP (displayed as part of the message "Your OTP is 647532" 706), copy button 707, and confirm button 708. FIG. 7C exemplarily illustrates a fourth embodiment of the ROTP message comprising a message 702, a verification mark 703, a brand name with a one-time password (OTP) 704, a brand logo 705, a brand icon 711 of the brand involved in a transaction with a user, the one-time password (OTP) of the ROTP (displayed as part of the message "Your OTP is 647532" 706), copy button 707, and "Unauthorized Access" button 710. FIG. 7D exemplarily illustrates a fifth embodiment of the ROTP message comprising a message 702, a verification mark 703, a brand name with a one-time password (OTP) 704, a brand logo 705, a brand icon 711 of the brand involved in a transaction with a user, the one-time password (OTP) of the ROTP (displayed as part of the message "Your OTP is 647532" 706), copy button 707, confirm button 708 and report fraud button 709.

Figures 8A, 8B:
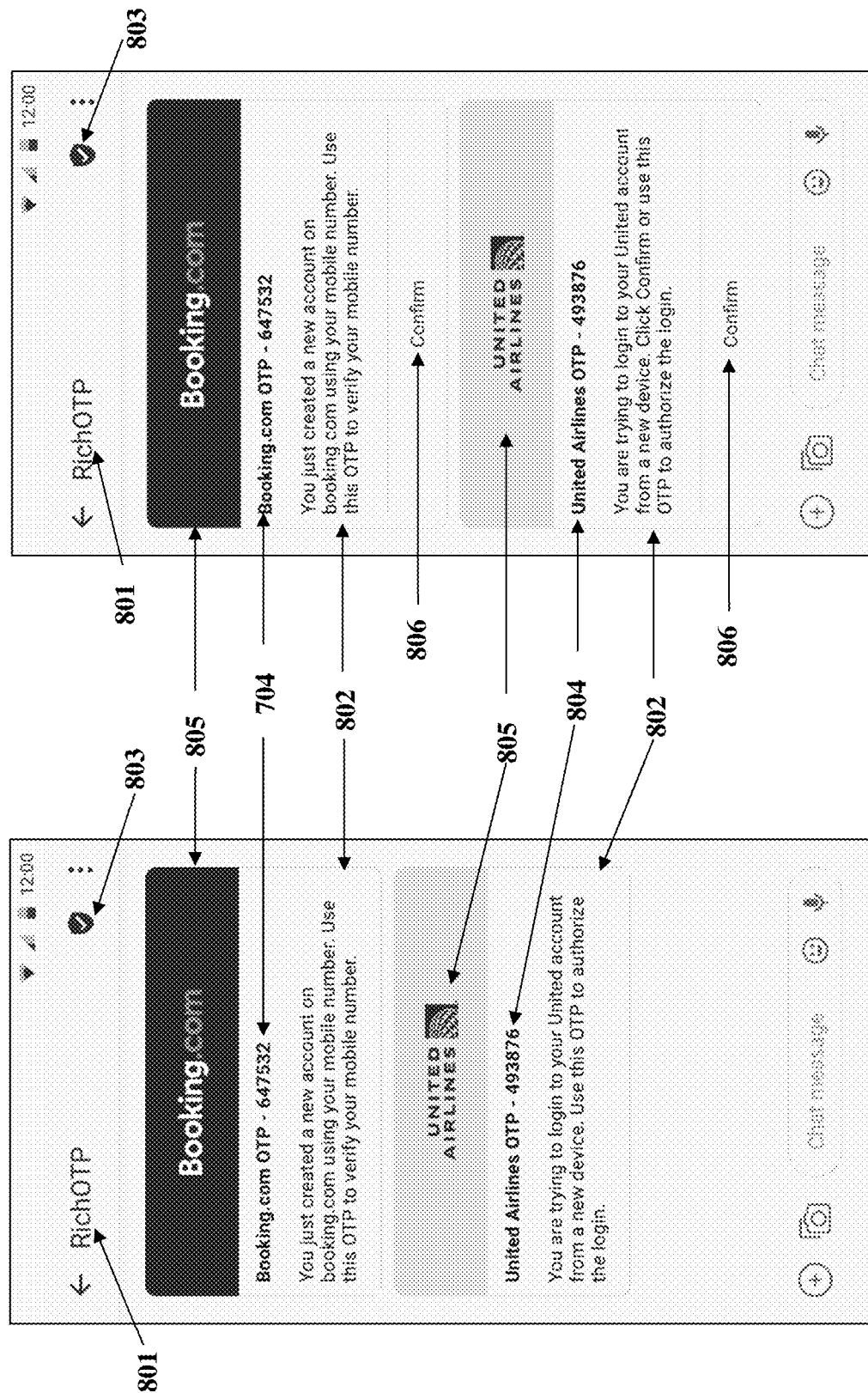
FIGS. 8A-8D exemplarily illustrates screen shots of another embodiment of a rich one-time password message received by a user from a verified sender ID, such as the sender ID "RichOTP", along with the brand identity of each brand sending a rich one-time password message.
Figures 8C, 8D:
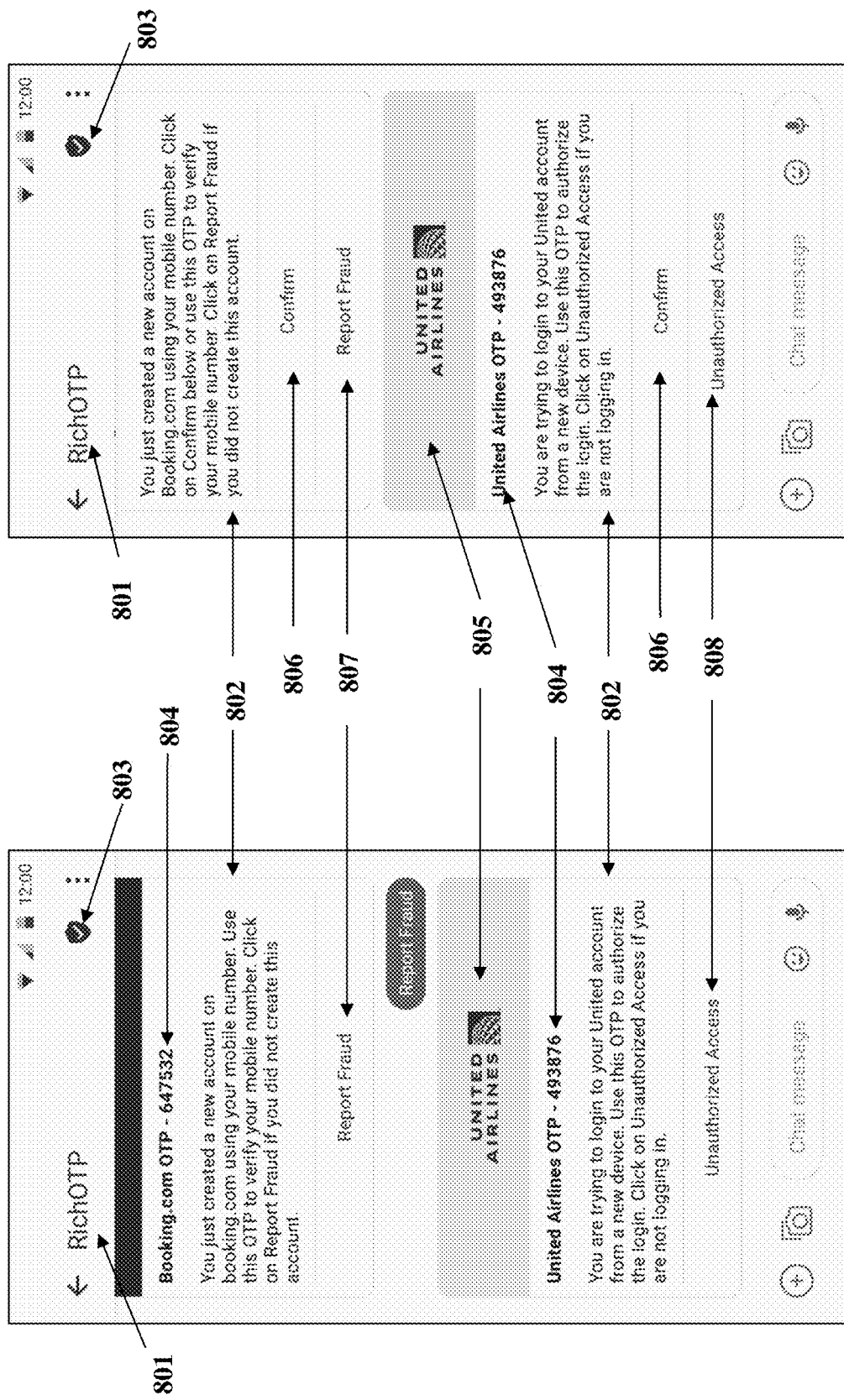

FIGS. 8A-8D exemplarily illustrates screen shots of another embodiment of a rich one-time password (ROTP) message received by a user from a verified sender ID 801, for example, RichOTP, with the brand identity of each brand sending a rich one-time password message. FIG. 8A exemplarily illustrates a first embodiment of the ROTP message comprising a message 802, a verification mark 803, a brand name with a one-time password (OTP) 804, a brand logo 805 of the brand, for example, Booking.com and United Airlines involved in a transaction with a user. The brand name with the OTP 804 is displayed in bold font. The OTP is rendered on a user device as a rich card. FIG. 8B exemplarily illustrates a second embodiment of the ROTP message comprising a confirmation button 806 along with a message 802, a verification mark 803, a brand name with an OTP 804, and a brand logo 805. FIG. 8C exemplarily illustrates a third embodiment of the ROTP message comprising a report fraud button 807 or an unauthorized access button 808 along with a message 802, a verification mark 803, a brand name with an OTP 804, and a brand logo 805. FIG. 8D exemplarily illustrates a fourth embodiment of the ROTP message comprising both a confirmation button 806 and a report fraud button 807 and/or an unauthorized access button 808, along with a message 802, a verification mark 803, a brand name with an OTP 804, and a brand logo 805.

Figures 9A, 9B:
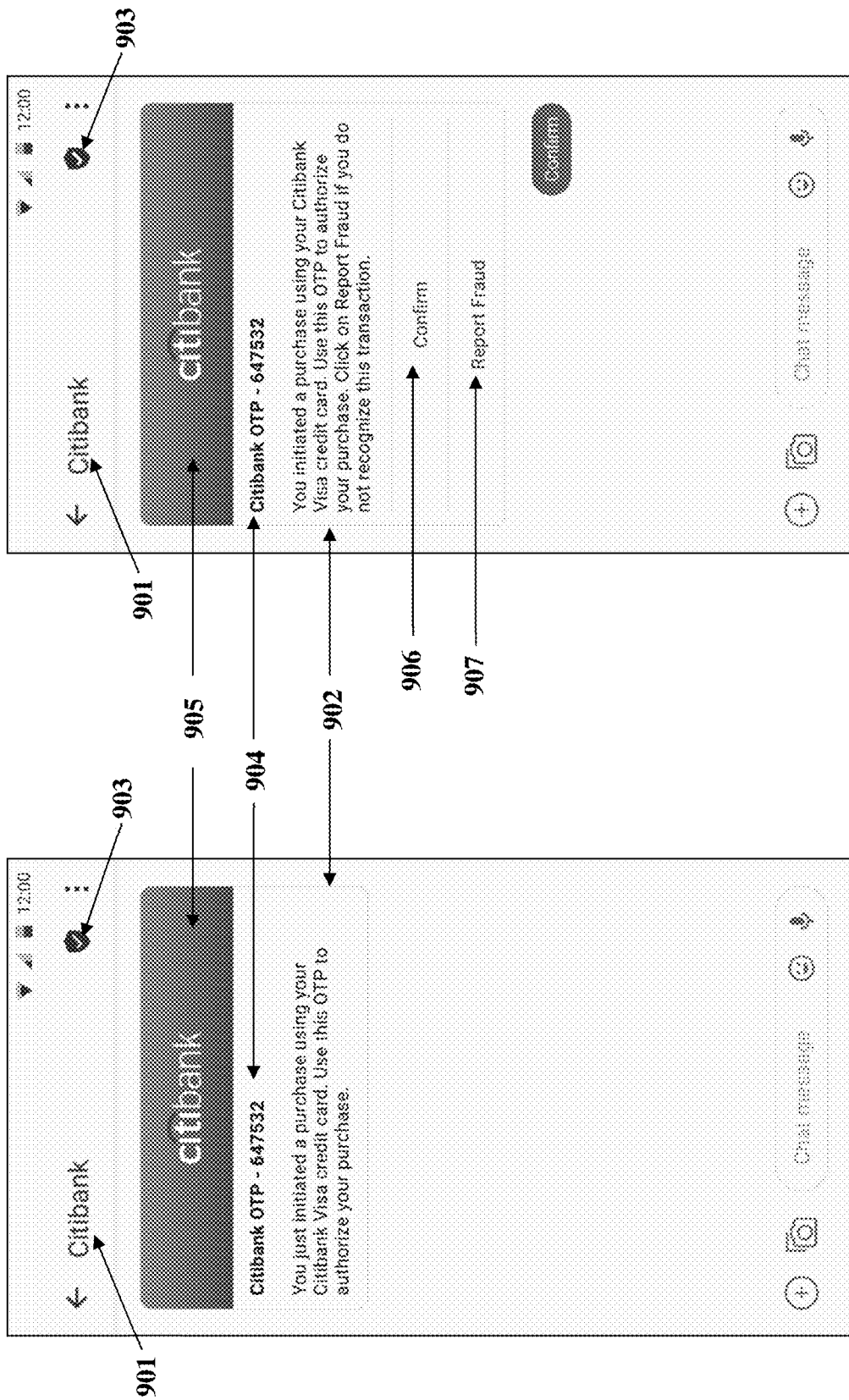
FIGS. 9A-9B exemplarily illustrates screen shots of another embodiment of a rich one-time password (ROTP) message received by a user from a verified sender ID of brand, for example, Citibank.

FIGS. 9A-9B exemplarily illustrates screen shots of another embodiment of a rich one-time password (ROTP) message received by a user from a verified sender ID 901 of brand, for example, Citibank. FIG. 9A exemplarily illustrates a first embodiment of the ROTP message comprising a message 902, a verification mark 903, a brand name with a one-time password (OTP) 904, and a brand logo 905 of the brand involved in a transaction with a user. The brand name with the OTP 904 is displayed in bold font. The OTP is rendered on a user device as a rich card. FIG. 9B exemplarily illustrates a second embodiment of the ROTP message comprising a confirmation button 906 and a report fraud button 907 along with a message 902, a verification mark 903, a brand name with an OTP 904, and a brand logo 905.

Figures 10A, 10B:
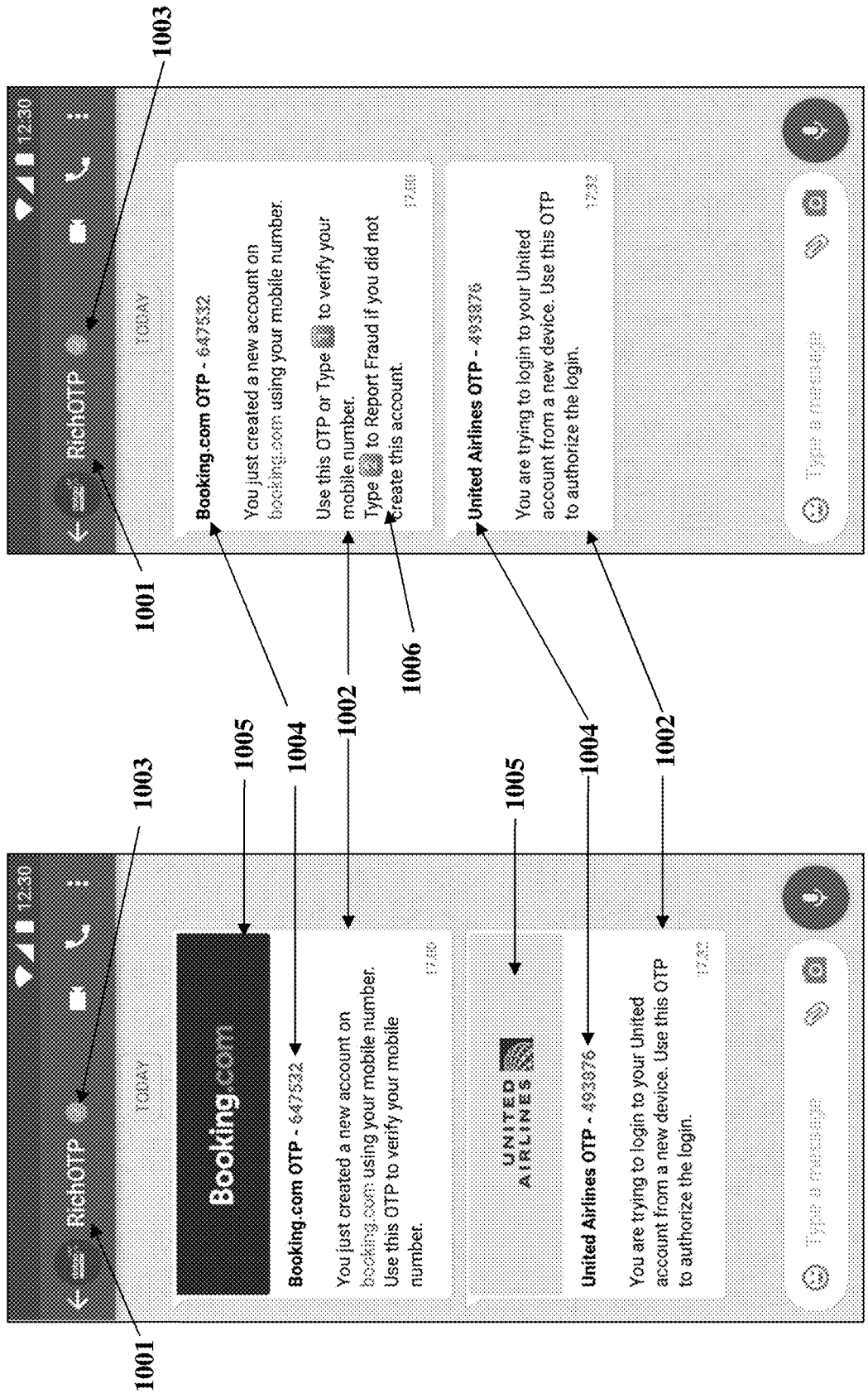
FIGS. 10A-10B exemplarily illustrates screen shots of another embodiment of a rich one-time password message transmitted to a mobile number of a user via another messaging channel, for example, WhatsApp, from a verified sender ID, for example, RichOTP.

FIGS. 10A-10B exemplarily illustrates screen shots of another embodiment of a rich one-time password (ROTP) message transmitted to a mobile number of a user via another messaging channel, for example, WhatsApp, from a verified sender ID 1001, for example, RichOTP. FIG. 10A exemplarily illustrates a first embodiment of the ROTP message comprising a message 1002, a verification mark 1003, a brand name with a one-time password (OTP) 1004, a brand logo 1005 of the brand, for example, Booking.com and United Airlines, involved in a transaction with a user. The brand name with the OTP 1004 is displayed in bold font. FIG. 10B exemplarily illustrates a second embodiment of the ROTP message comprising a menu of options 1006 for confirm and report fraud actions, such as "send or type 1 to confirm, 2 to report fraud" along with a message 1002, a verification mark 1003, and a brand name with an OTP 1004.

Figures 10C, 10D:
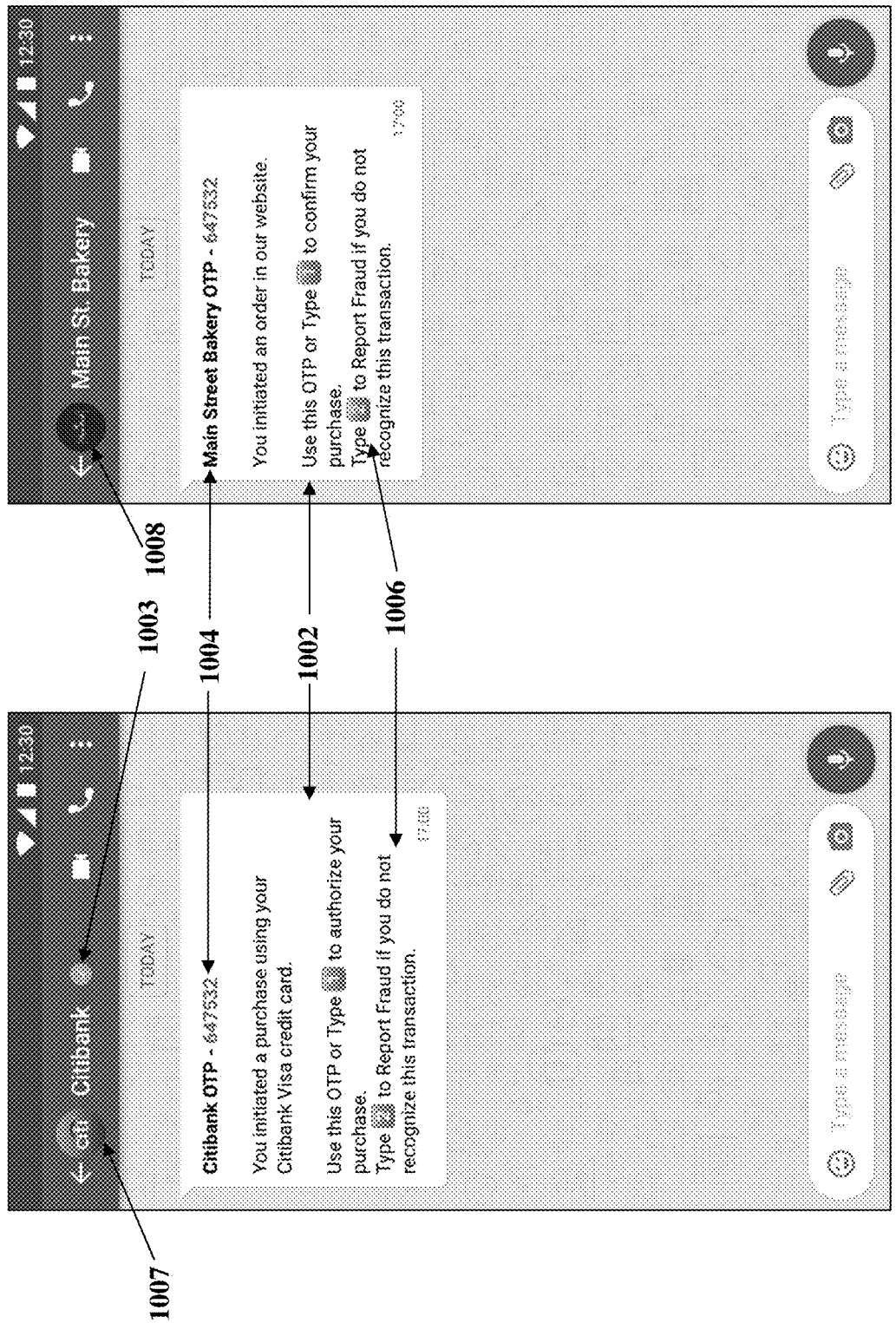
FIG. 10C exemplarily illustrates a screen shot of another embodiment of a rich one-time password message received by a user in WhatsApp from a verified sender ID of a brand, for example, "Citibank"
FIG. 10D exemplarily illustrates screen shot of another embodiment of a rich one-time password message received by a user in WhatsApp from a non-verified sender ID of a brand, for example, "Main Street Bakery", FIG. 11 exemplarily illustrates a process flow for registering for a rich one-time password message service by a brand, or a developer on behalf of a brand.

FIG. 10C exemplarily illustrates a screen shot of another embodiment of a rich one-time password message received by a user in WhatsApp from a verified sender ID 1007 of a brand, for example, "Citibank", comprising a menu of options 1006 for confirm and report fraud actions, such as "send or type 1 to confirm, 2 to report fraud" along with a message 1002, a verification mark 1003, and a brand name with an OTP 1004. FIG. 10D exemplarily illustrates screen shot of another embodiment of a rich one-time password message received by a user in WhatsApp from a non-verified sender-id 1008 of a brand, "Main Street Bakery", comprising a menu of options 1006 for confirm and report fraud actions, such as "send or type 1 to confirm, 2 to report fraud" along with a message 1002, and a brand name with an OTP 1004.

Figure 11:
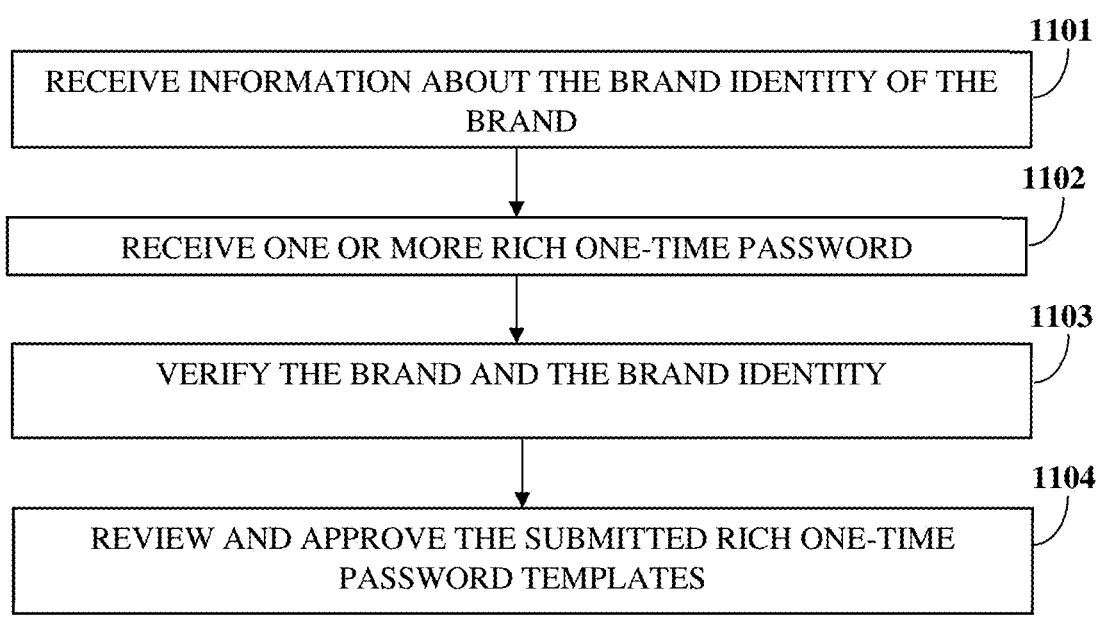

FIG. 11 exemplarily illustrates a process flow for registering for a rich one-time password (ROTP) message service by a brand or a developer on behalf of a brand, with a rich one-time password application (ROTPA) provider. A ROTPA provider is an entity that manages an instance of a ROTPA and offers it as a service to brands and developers. There can be one or more ROTPA providers offering this service to developers. The brand or the developer submits 1101 information about the brand identity of the brand. The brand identity comprises of one or more of a brand name, a brand icon, a brand logo. The brand may also submit the privacy policy, and terms of use. The brand or the developer submits 1102 one or more ROTP templates. The ROTP template varies for different data messaging applications, for example, Rich Communication Services (RCS), WhatsApp, iMessage, Viber, etc., based on the capabilities of the underlying platforms. The ROTP template also varies for different use cases for sending the ROTP messages over the same platform, for example, confirming a banking transaction, logging into the bank account on the web, and logging into the bank's mobile app. The ROTPA provider performs 1103 a verification of the brand and the brand identity. The ROTPA provider reviews and approves 1104 the submitted ROTP templates. As part of the review, the ROTP provider ensures that the ROTP message and the fallback SMS, if any, are OTP messages and not some other notification from the brand. The brand or the developer specifies one of the approved ROTP templates to be used, at the time of sending the ROTP messages. The ROTPA sends the ROTP messages using the specified and approved ROTP template to the mobile number of the user.

Figure 12A:
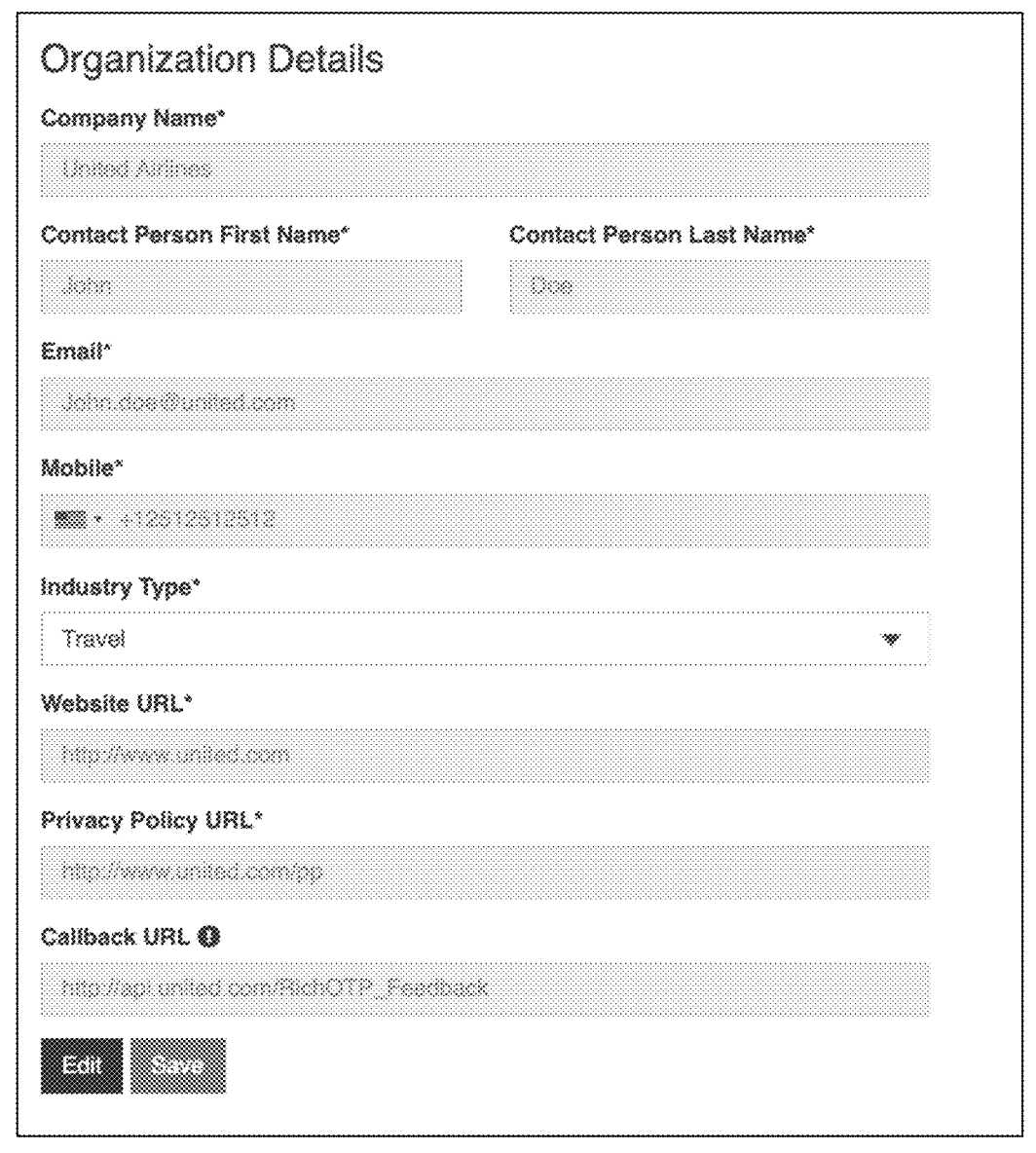
Figure 12B:
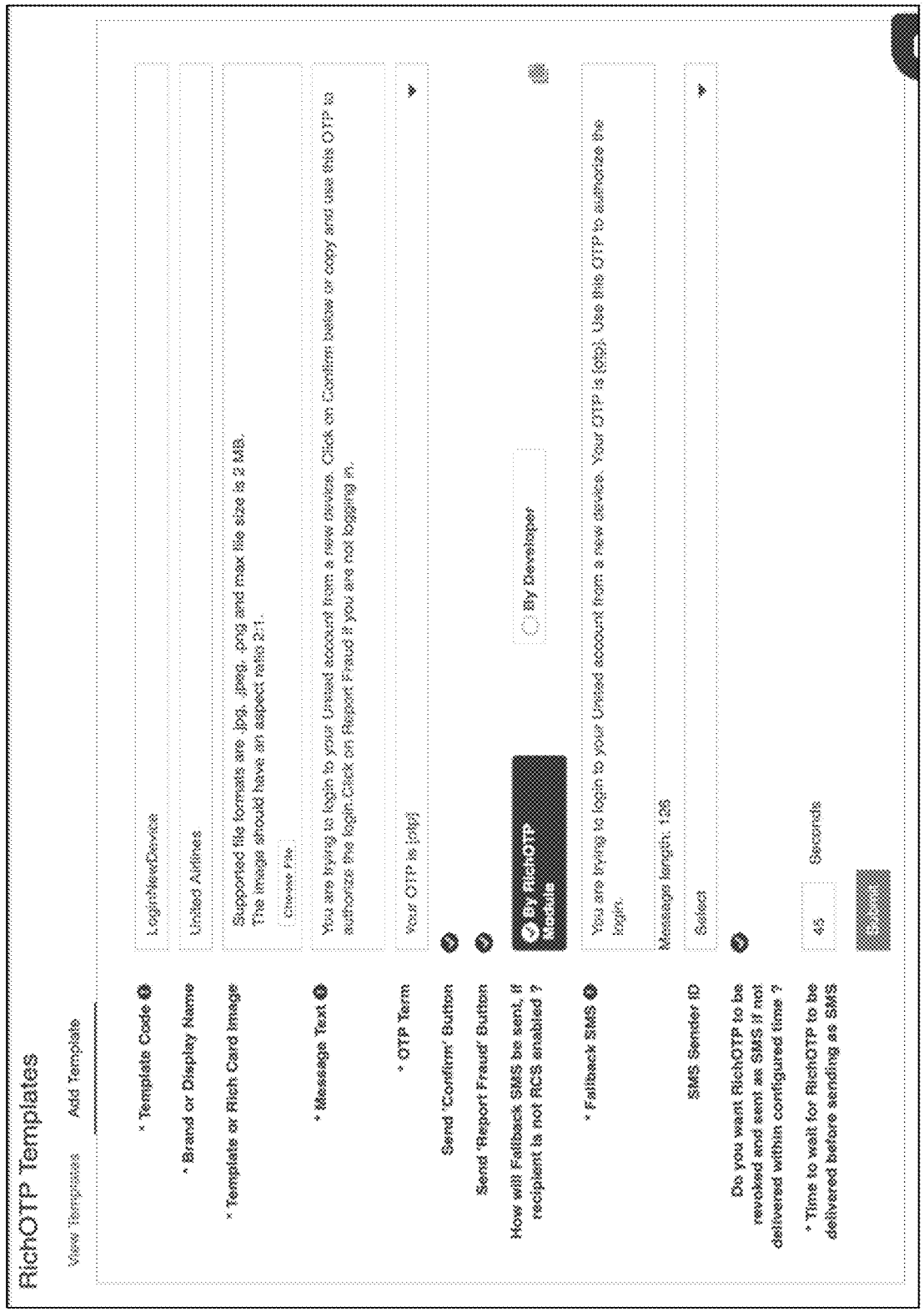

FIGS. 12A-12B exemplarily illustrates screenshots of a rich one-time password (ROTP) message service registration. A brand or a developer on behalf of the brand registers for the ROTP services for a brand by submitting brand details, for example, company name, last name and first name of a contact person, email ID, mobile number, industry type, website uniform resource locator (URL), privacy policy URL, Callback URL, etc., as exemplarily illustrated in FIG. 12A. After registration, the brand or the developer submits ROTP details, for example, a brand name, a brand icon, a brand logo, etc. A rich card image tab and a display name tab (not shown) enables the brand or the developer to edit and save an image, for example, the brand logo, or the brand icon. As exemplarily illustrated in FIG. 12B, the brand developer registers for a rich one-time password (ROTP) message service by submitting information about the brand identity of the brand. The brand/developer specifies a rich one-time password template to be used for sending the ROTP messages by the rich one-time password application (ROTPA). Each of the ROTP templates includes multiple elements. For example, rich one-time password template for rich communication service (RCS) comprise: Template code, Brand/display name, Template/rich card image, Message text, OTP term, send 'Confirm' button, send 'report fraud' button, "how will fallback SMS be sent, if recipient is not RCS enabled" option, short messaging service (SMS) fallback option, Fallback SMS, SMS sender mask, SMS sender ID, "Do you want RichOTP to be revoked and send as SMS if not delivered within configured time?" option, "Time to wait for RichOTP to be delivered before sending as SMS" option, etc., as exemplarily illustrated in FIG. 12B. Furthermore, the elements in the rich one-time password template can be modified based on the rich channel, for example, RCS, iMessage, WhatsApp, Viber, etc., used to send the ROTP message. For example, some of the elements of the rich one-time password template may be common to all rich channels, for example, RCS, iMessage, WhatsApp, Viber, etc., whereas other elements may have values that are different and specific to a particular channel depending on the type of the rich channel used to send the ROTP message. A ROTP provider performs a verification of the brand and the brand identity. The ROTP provider also reviews and approves the submitted rich one-time password templates. As part of the review, the ROTP provider may ensure that the ROTP message and the fallback SMS, if any, are OTP messages and not some other notification from the brand. The brand or the developer specifies one of the approved rich one-time password templates to be used for sending rich one-time password messages by the rich one-time password (ROTPA) application. The ROTPA sends ROTP messages using the specified and approved rich one-time password template to the user device. Furthermore, the brand or the developer can add multiple rich one-time password templates to the ROTPA, for use for sending the ROTP messages by the ROTPA.

The non-transitory computer readable storage medium disclosed herein stores computer program codes comprising instructions executable by at least one processor for creating and transmitting a rich one-time password (ROTP) message. The computer program codes comprise a first computer program code for receiving a request to create and transmit the ROTP message from a brand. The brand comprises an enterprise or a division of an enterprise, or a brand used by the enterprise or an organization, that intends to send a one-time password to authenticate a user, wherein a reference made to a brand taking or receiving an action refers to a developer or another person taking or receiving the action on behalf of the brand, or an application that is taking or receiving the action on behalf of the brand. and wherein said brand identity comprises one or more of a brand name, a brand icon, and a brand logo of said brand involved in a transaction with said user. A second computer program code for creating a ROTP message; and a third computer program code for transmitting said created ROTP message to a mobile number of a user over a network.

The computer program codes further comprises a fourth computer program code for determining if the mobile number is enabled for one of multiple rich messaging platforms, and further comprises a fifth computer program code for determining a type of the rich one-time password message to be transmitted to the mobile number via the rich messaging platform. The computer program codes further comprises a sixth computer program code for determining if the mobile number is enabled for rich communication services, and further comprises a seventh computer program code to create the rich one-time password message to be transmitted to the mobile number via the rich communication services. The computer program codes further comprises an eighth computer program code for determining if the mobile number is enabled for WhatsApp, and further comprises a ninth computer program code to create the rich one-time password message to be transmitted to the mobile number via the WhatsApp.

The computer program codes further comprises a tenth computer program code for determining rich data messaging capabilities of multiple messaging platforms and to map a request from the developer to messaging platform specific capabilities; an eleventh computer program code to transmit the rich one-time password (ROTP) message to a user device; a twelfth computer program code for monitoring the delivery of the ROTP message to the user; and a thirteenth computer program code for delivering the ROTP message to said user via a second platform if there is delivery failure or delay in delivery of the ROTP message to the user via a first platform. The second platform is another data messaging platform, or a short messaging service platform.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used in the method disclosed herein are C, C++, C#, Java®, JavaScript®, Fortran, Ruby, Perl®, Python®, Visual Basic®, hypertext preprocessor (PHP), Microsoft®.NET, Objective-C®, the Swift™ programming language of Apple Inc., etc. Other object-oriented, functional, scripting, and/or logical programming languages can also be used. In an embodiment, the computer program codes or software programs are stored on or in one or more mediums as object code.

The foregoing examples have been provided merely for illustration and are in no way to be construed as limiting of the method disclosed herein. While the method has been described with reference to various embodiments, it is understood that the words, which have been used herein, are words of description and illustration, rather than words of limitation. Further, although the methods have been described herein with reference to particular means, materials, and embodiments, the methods are not intended to be limited to the particulars disclosed herein; rather, the method extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method disclosed herein in their aspects.

We claim:

1. A method for creating and transmitting a rich one-time password (RichOTP) message comprising a one-time password (OTP) and a brand identity, said method employing a RichOTP application executable by at least one processor configured to execute computer program instructions for performing said method comprising:
   receiving a short message service (SMS) message from a brand;
   determining that said brand is registered for sending said RichOTP message;
   determining that the received SMS message contains said OTP;

creating said RichOTP message based on a reviewed and approved template, wherein said created RichOTP message comprises a message, a verification mark, a brand name, a brand logo, a brand icon of the brand involved in a transaction with a user, and the OTP; and transmitting said RichOTP message created by said RichOTP application to a mobile number of said user over a network.

2. The method of claim 1, further comprising determining that said mobile number of said user is enabled for one or more rich messaging platforms.

3. The method of claim 2, further comprising:

transmitting said received SMS message without any change to said mobile number of said user, if said mobile number of said user is not enabled for said one or more rich messaging platforms;

registering said brand if said brand is not already registered for transmitting said RichOTP message, wherein registration of said brand comprises:

receiving one or more RichOTP templates from said brand;

performing a verification of said brand and said brand identity; and reviewing and approving said one or more RichOTP templates; and receiving a selection of a confirmation of said transaction or a report of a potentially fraudulent activity from a user device.

4. The method of claim 3, wherein said user conveys said confirmation of said transaction using an optionally created confirm button in said RichOTP message, and wherein said user conveys said potentially fraudulent activity using a report fraud button that is optionally created in said RichOTP message.

5. The method of claim 2, wherein said RichOTP application determines types of RichOTP messages to be transmitted to said mobile number of said user via said one or more rich messaging platforms.

6. The method of claim 5, wherein said RichOTP application determines if said mobile number is enabled for WhatsApp application, and wherein said RichOTP application creates said RichOTP message to be transmitted to said mobile number via said WhatsApp application.

7. The method of claim 5, wherein said RichOTP application determines rich data messaging capabilities of a plurality of messaging platforms and maps a request from said developer to said determined rich data messaging capabilities of said plurality of messaging platforms, before transmitting said RichOTP message to said mobile number of said user.

8. The method of claim 7, wherein said RichOTP application monitors delivery of said RichOTP message transmitted to said mobile number of said user, wherein said RichOTP application delivers said RichOTP message to said user via a second platform if there is delivery failure or delay in delivery of said RichOTP message to said user via a first platform, and wherein said second platform is another data messaging platform or a short messaging service (SMS) platform.

9. The method of claim 1, wherein said brand comprises an enterprise or a division of an enterprise, or a brand used by said enterprise or an organization, that intends to send said OTP to authenticate said user, wherein a reference made to said brand taking or receiving an action refers to a developer or another person taking or receiving said action on behalf of said brand, or an application that is taking or receiving said action on behalf of said brand.

10. The method of claim 1, wherein said method is executed using one or more of an application program interface designed for said RichOTP message, an application program interface designed for sending said SMS message, a protocol designed for sending said SMS message, and a software development kit designed for said RichOTP message.

11. The method of claim 1, wherein said RichOTP application transmits said SMS message received by said RichOTP application without any change when it is identified that said received SMS message does not contain said OTP.

12. A system for creating and transmitting a rich one-time password (RichOTP) message comprising a one-time password (OTP) and a brand identity, comprising:

a processor;

a non-transitory computer readable storage medium communicatively coupled to said processor, said non-transitory computer readable storage medium configured to store a RichOTP application executable by said processor, wherein said RichOTP application is configured to manage actions associated with said creating and transmitting said RichOTP message, wherein said RichOTP message comprises said one-time password (OTP) and said brand identity;

said RichOTP application comprising:

a reception module for receiving a short message service (SMS) message from a brand;

a routing module for determining that a brand is registered for sending said RichOTP message;

said reception module for determining that the received SMS message contains said OTP;

a creation module for creating said RichOTP message based on a reviewed and approved template, wherein said created RichOTP message comprises a message, a verification mark, a brand name, a brand logo, a brand icon of the brand involved in a transaction with a user, and the OTP; and a transmitting module for transmitting said RichOTP message created by said RichOTP application to a mobile number of said user over a network.

13. The system of claim 12, further comprising:

said routing module for determining that said mobile number of said user is enabled for one or more rich messaging platforms.

14. The system of claim 13, further comprising:

said transmitting module for transmitting said received SMS message without any change to said mobile number of said user, if said mobile number of said user is not enabled for said one or more rich messaging platforms;

said routing module for registering said brand if said brand is not already registered for transmitting said RichOTP message, wherein registration of said brand comprises:

receiving one or more RichOTP templates from said brand;

performing a verification of said brand and said brand identity; and reviewing and approving said one or more RichOTP templates;

a response module for receiving a selection of a confirmation of said transaction or a report of a potentially fraudulent activity from a user device; and a feedback module for processing an action corresponding to said selection received from said mobile number of said user by said response module.

15. The system of claim 14, wherein said user conveys said confirmation of said transaction using an optionally created confirm button in said RichOTP message, and wherein said user conveys said potentially fraudulent activity using a report fraud button that is optionally created in said RichOTP message.

16. The system of claim 13, wherein said RichOTP application determines types of RichOTP messages to be transmitted to said mobile number of said user via said one or more rich messaging platforms.

17. The system of claim 16, wherein said routing module determines if said mobile number is enabled for WhatsApp application, and wherein said creation module creates said RichOTP message to be transmitted to said mobile number via said WhatsApp application.

18. The system of claim 16, wherein said routing module determines rich data messaging capabilities of a plurality of messaging platforms and maps a request from said developer to said determined rich data messaging capabilities of said plurality of messaging platforms, before transmitting said RichOTP message to said mobile number of said user.

19. The system of claim 18, further comprising a re-routing module for monitoring said RichOTP message transmitted to said mobile number of said user, wherein said rich RichOTP application delivers said RichOTP message to said user via a second platform if there is delivery failure or delay in delivery of said RichOTP message to said user via a first platform, and wherein said second platform is another data messaging platform or a short messaging service (SMS) platform.

20. The system of claim 12, wherein said brand comprises an enterprise or a division of said enterprise, or a brand used by said enterprise or an organization, that intends to send said OTP to authenticate said user, wherein a reference made to said brand taking or receiving an action refers to a developer or another person taking or receiving said action on behalf of said brand, or an application that is taking or receiving said action on behalf of said brand.

21. The system of claim 12, wherein creation and transmission of said RichOTP message is performed using one or more of an application program interface designed for said RichOTP message, an application program interface designed for sending said SMS message, a protocol designed for sending said SMS message, and a software development kit designed for rich said RichOTP message.

22. The system of claim 12, wherein said RichOTP application transmits said SMS message received by said RichOTP application without any change when it is identified that said received SMS message does not contain said OTP.

23. A non-transitory computer readable storage medium having embodied thereon, computer program codes comprising instructions executable by at least one processor for creating and transmitting a rich one-time password (RichOTP) message comprising a one-time password (OTP) and a brand identity, said computer program codes comprising:
a first computer program code for receiving a short message service (SMS) message from a brand, wherein said brand comprises an enterprise or a division of an enterprise, or said brand used by said enterprise or an organization, that intends to send said OTP to authenticate a user, wherein a reference made to a brand taking or receiving an action refers to a developer or another person taking or receiving said action on behalf of said brand, or an application that is taking or receiving said action on behalf of said brand;
a second computer program code for determining that said brand is registered for sending said RichOTP message;
a third computer program code for determining that the received SMS message contains said OTP;
a fourth computer program code for creating said RichOTP message based on a reviewed and approved template, wherein said created RichOTP message comprises a message, a verification mark, a brand name, a brand logo, a brand icon of the brand involved in a transaction with said user, and the OTP;
a fifth computer program code for transmitting said RichOTP message created by said RichOTP application to a mobile number of said user over a network.

24. The computer program codes of claim 23, further comprising:
a sixth computer program code for determining that said mobile number of said user is enabled for one or more rich messaging platforms'
a seventh computer program code for transmitting said received SMS message without any change to said mobile number of said user, if said mobile number of said user is not enabled for said one or more rich messaging platforms;
an eighth computer program code for registering said brand if said brand is not already registered for transmitting said RichOTP message, wherein registration of said brand comprises:
receiving one or more RichOTP templates from said brand;
performing a verification of said brand and said brand identity; and
reviewing and approving said one or more RichOTP templates; and
a ninth computer program code for receiving a selection of a confirmation of said transaction or a report of a potentially fraudulent activity from a user device.

\* \* \* \* \*